(12) United States Patent
Iwasaki

(10) Patent No.: US 8,622,602 B2
(45) Date of Patent: Jan. 7, 2014

(54) LIGHT GUIDE PLATE AND PLANAR LIGHTING DEVICE

(71) Applicant: Fujifilm Corporation, Tokyo (JP)

(72) Inventor: Osamu Iwasaki, Kanagawa (JP)

(73) Assignee: Fujifilm Corporation (JP)

( * ) Notice: Subject to any disclaimer, the term of this patent is extended or adjusted under 35 U.S.C. 154(b) by 0 days.

(21) Appl. No.: 13/860,684

(22) Filed: Apr. 11, 2013

(65) Prior Publication Data

US 2013/0223101 A1 Aug. 29, 2013

Related U.S. Application Data

(63) Continuation of application No. PCT/JP2011/071497, filed on Sep. 21, 2011.

(30) Foreign Application Priority Data

Oct. 12, 2010 (JP) .................................. 2010-230083
Mar. 28, 2011 (JP) .................................. 2011-070390

(51) Int. Cl.
 *F21V 7/04* (2006.01)
(52) U.S. Cl.
 USPC ............................ 362/617; 362/615; 362/628
(58) Field of Classification Search
 USPC .......... 362/615, 616, 617, 628, 607, 608, 609
 See application file for complete search history.

(56) References Cited

U.S. PATENT DOCUMENTS

| | | | |
|---|---|---|---|
| 5,966,192 A | 10/1999 | Higuchi et al. | |
| 5,993,020 A | 11/1999 | Koike | |
| 6,217,184 B1 | 4/2001 | Koike et al. | |
| 7,771,108 B2 | 8/2010 | Iwasaki | |
| 2009/0103327 A1 | 4/2009 | Iwasaki et al. | |
| 2012/0281166 A1* | 11/2012 | Iwasaki | ............................ 349/65 |

FOREIGN PATENT DOCUMENTS

| | | |
|---|---|---|
| JP | 07-036037 A | 2/1995 |
| JP | 08-220346 A | 8/1996 |
| JP | 08-248233 A | 9/1996 |
| JP | 08-271739 A | 10/1996 |

(Continued)

OTHER PUBLICATIONS

The Translation of the International Preliminary Report of Patentability and the Written Opinion of the International Searching Authority with the mailing date of May 2, 2013, which corresponds to International Application No. PCT/JP2011/071497 and is related to U.S. Appl. No. 13/860,684.

(Continued)

*Primary Examiner* — Evan Dzierzynski
(74) *Attorney, Agent, or Firm* — Studebaker & Brackett PC

(57) ABSTRACT

The light guide plate includes two or more layers superposed on each other in a direction substantially perpendicular to a light exit surface and containing scattering particles at different particle concentrations. The thicknesses of the two or more layers in the direction substantially perpendicular to the light exit surface are changed so that the combined particle concentration of the light guide plate has, in a direction perpendicular to at least one light incidence surface, a first local maximum value on at least one side closer to the at least one light incidence surface and a second local maximum value located at a position farther from the at least one light incidence surface than at least one position of the first local maximum value and being larger than the first local maximum value.

9 Claims, 23 Drawing Sheets

(56) References Cited

FOREIGN PATENT DOCUMENTS

| | | |
|---|---|---|
| JP | 11-153963 A | 6/1999 |
| JP | 2003-090919 A | 3/2003 |
| JP | 2004-171948 A | 6/2004 |
| JP | 2005-108676 A | 4/2005 |
| JP | 2005-302322 A | 10/2005 |
| JP | 4127897 B2 | 7/2008 |
| JP | 2009-117349 A | 5/2009 |
| JP | 2009-117357 A | 5/2009 |

OTHER PUBLICATIONS

International Search Report; PCT/JP2011/071497; Dec. 27, 2011.

* cited by examiner

— EXAMPLE 41a ----- EXAMPLE 41b --- EXAMPLE 41c

— EXAMPLE 41d ----- EXAMPLE 41e --- EXAMPLE 41f

— EXAMPLE 41g ----- EXAMPLE 41h --- EXAMPLE 41i

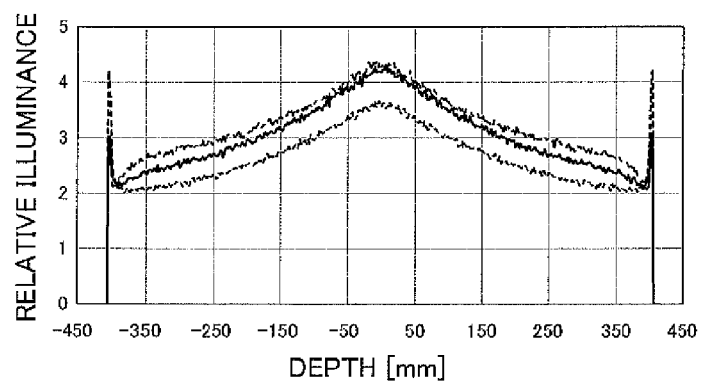
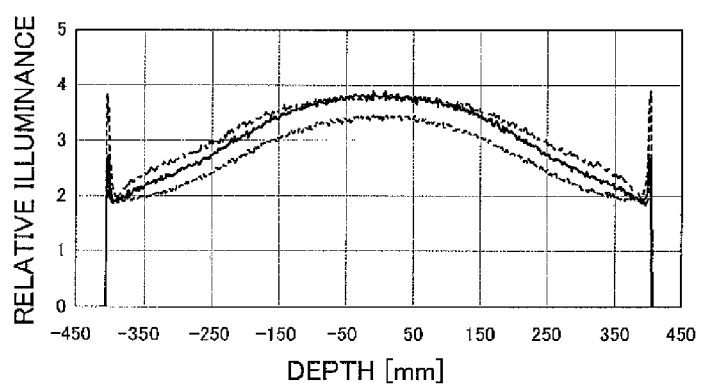
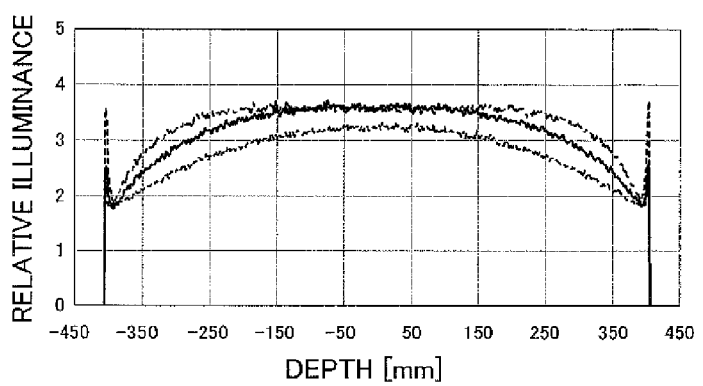

LIGHT GUIDE PLATE AND PLANAR LIGHTING DEVICE

BACKGROUND OF THE INVENTION

The present invention relates to a light guide plate and a planar lighting device that may be used in liquid crystal displays and the like.

A liquid crystal display uses a planar lighting device (a backlight unit) which illuminates a liquid crystal display panel by irradiation of light from the back side of the liquid crystal display panel. The backlight unit is configured using a light guide plate for diffusing light emitted from an illumination light source to illuminate the liquid crystal display panel and parts such as a prism sheet and a diffusion sheet for making outgoing light from the light guide plate uniform.

Currently, large-sized liquid crystal televisions predominantly use a so-called underneath type backlight unit including a light guide plate disposed immediately above an illumination light source. This type of backlight unit ensures uniform light amount distribution and necessary luminance by disposing a plurality of cold cathode tubes used as light sources behind the liquid crystal display panel and providing the inside of the casing with white reflection surfaces.

However, the underneath type backlight unit requires a thickness of about 30 mm in a direction perpendicular to the liquid crystal display panel in order to make the light amount distribution uniform and further reduction in thickness is difficult to achieve.

On the other hand, an exemplary backlight unit that allows the thickness reduction includes one using a light guide plate which receives light emitted from an illumination light source, guides the received light in predetermined directions and emits the guided light through a light exit surface that is different from the surface through which the light entered.

As the backlight unit using the light guide plate as described above, there has been proposed a backlight unit of a type using a light guide plate in plate form which is obtained by incorporating scattering particles for scattering light in a transparent resin and which receives light through its lateral faces and emits the received light through the front face.

For example, JP 7-36037 A describes a light scattering and guiding light source device comprising a light scattering guide having at least one light incidence surface region and at least one light exit surface region and light source means for light incidence through the light incidence surface region, the light scattering guide having a region that has a tendency to decrease in thickness with increasing distance from the light incidence surface.

JP 8-248233 A describes a surface light source device comprising a light scattering guide, a prism sheet provided on the side of the light scattering guide closer to the light exit surface, and a reflector provided on the back side of the light scattering guide. JP 8-271739 A describes a liquid crystal display comprising a light emitting direction correcting element which is formed of a plate-shaped optical material and includes a light incidence surface having a repeated undulate pattern of prism arrays and a light exit surface having light diffusing properties. JP 11-153963 A describes a light source device comprising a light scattering guide provided with scattering ability inside and light supply means for supplying light through an end face portion of the light scattering guide.

Also proposed in addition to the above light guide plates are a light guide plate having a larger thickness at the center thereof than at an end on the light incidence side and at the opposite side end; a light guide plate having a reflection surface inclined in such a direction that the thickness of the light guide plate increases with increasing distance from a light entrance portion; and a light guide plate having such a shape that the distance between the front surface portion and the rear surface portion is the smallest at the light entrance portion and that the thickness of the light guide plate is the largest when the distance from the light entrance portion is the largest (See, for example, JP 2003-90919 A, JP 2004-171948 A, JP 2005-108676 A, JP 2005-302322 A, and JP 8-220346 A).

In addition, JP 2009-117349 A describes a lighting device having a light guide plate of which the light exit surface is concave, and JP 2009-117357 A describes a light guide plate of which the light exit surface is downwardly convex (i.e., the light exit surface is concave).

JP 2009-117357 A discloses a two-layer light guide plate in which the interface between the first layer and the second layer is inclined in the directions approaching the light exit surface with increasing distance from the ends toward the center of the light guide plate (so that the cross section is in the shape of an isosceles triangle).

In addition, JP 4127897 B (JP 11-345512 A) describes a planar light source device comprising a sheet member in which at least one non-scattering light guide region and at least one scattering light guide region containing particles with different refractive indices uniformly dispersed in the same material as the non-scattering light guide region overlap each other, a light source lamp being mounted on one end face, the distribution state of the amount of light emitted from the main surface being controlled by locally adjusting the particle concentration in the sheet thickness of both the regions, the scattering light guide region including convex light guide blocks and the non-scattering light guide region including concave light guide blocks corresponding to the convex light guide blocks.

SUMMARY OF THE INVENTION

However, the backlight unit of, for example, a tandem type using a light guide plate of which the thickness decreases with increasing distance from the light source suffers from inferior light use efficiency to the underneath type in relation to the relative dimensions of the cold cathode tubes and the reflector although the backlight unit can be reduced in thickness. Further, in cases where the light guide plate used is so shaped as to receive cold cathode tubes in grooves formed therein, the light guide plate can be shaped in such a manner that the thickness decreases with increasing distance from the cold cathode tubes but the reduction in the thickness of the light guide plate increases the luminance just above the cold cathode tubes disposed in the grooves, thus causing uneven luminance on the light exit surface to stand out. In addition, the light guide plates of these types each have a complex shape and therefore increase machining costs, thus leading to increased costs when used in the backlight of a large-sized liquid crystal television having a screen size of, for example, 37 inches or more and in particular 50 inches or more.

JP 2003-90919 A, JP 2004-171948 A, JP 2005-108676 A and JP 2005-302322 A propose light guide plates of which the thickness is increased with increasing distance from the light incidence surface in order to achieve stable manufacturing while suppressing luminance unevenness (unevenness in the amount of light) using multireflection. However, these light guide plates are transparent members and allow light received from the light source to penetrate to the opposite end side and therefore need to have prisms or dot patterns on the lower surface thereof.

There is also a method in which a reflection member is provided at the opposite end from the light incidence surface to emit the incident light through the light exit surface by multireflection. However, an increase in size involves increases in thickness and weight of the light guide plate and the costs are also increased. Further, the light sources are projected into the light guide plate and perceived as such to cause uneven luminance and/or uneven illuminance.

In the lighting device described in JP 8-220346 A, the reflection surface is provided with serration grooves to serve as the diffuse reflection surface and therefore the light guide plate is to be increased in thickness in order to get larger in size. This involves an increase in weight and a complicated machining process, thus leading to increased costs.

The planar lighting device described in JP 2009-117349 A includes the light guide plate of which the light exit surface is concave. However, scattering particles are uniformly mixed in the whole of the light guide plate, which makes it difficult to further reduce the thickness in terms of optical properties. In addition, the light incidence surface is small, which hinders improvement of the light use efficiency (light incidence efficiency) without increasing the weight of the light guide plate.

The light guide plate described in JP 2009-117357 A is certainly a two-layer light guide plate in which the interface between the first layer and the second layer is inclined in the directions approaching the light exit surface with increasing distance from the ends toward the center of the light guide plate so that the cross section is in the shape of an isosceles triangle. However, adjustment of the shape of the second layer to optimize the amount of outgoing light has not been taken into account.

Also in the planar light source device described in JP 4127897 B (JP 11-345512 A), adjustment of the shape of the scattering light guide region to optimize the amount of outgoing light has not been taken into account. Further, a large-sized light guide plate expands and contracts greatly due to ambient temperature and humidity changes and repeats expansion and contraction of 5 mm or more in a size of about 50 inches. Therefore, it is not known on which side a flat light guide plate warps, on the light exit surface side or the reflection surface side. If the light guide plate warps on the light exit surface side, the light guide plate expands and contracts to push up the liquid crystal panel to cause pool-like unevenness in light emitted from the liquid crystal display. To avoid this, one may consider preliminarily providing a great distance between the liquid crystal panel and the backlight unit. However, this may cause a problem that it is impossible to reduce the thickness of the liquid crystal display.

Further, when a backlight unit is to be made thinner and larger, the particle concentration of the scattering particles needs to be reduced in order to guide the admitted light deep into the light guide plate but the reduced particle concentration of the scattering particles leads to insufficient diffusion of incident light in the vicinities of the light incidence surfaces. Therefore, light emitted from the vicinities of the light incidence surfaces may have visible bright lines (dark lines, unevenness) which are attributable to such causes as the intervals at which the light sources are disposed.

On the other hand, a high particle concentration of the scattering particles in the regions near the light incidence surfaces causes light having entered through the light incidence surfaces to be reflected in the regions near the light incidence surfaces. Therefore, the incident light may exit through the light incidence surfaces as return light or outgoing light through the regions near the light incidence surfaces which is not used because the regions are covered with the housing may increase.

An object of the present invention is to solve the problems associated with the foregoing prior art and to provide a large-sized thin light guide plate which is high in light use efficiency, and is capable of emitting light with reduced unevenness in luminance and obtaining a so-called convex or bell-shaped brightness distribution, that is, such a distribution that an area around the center of the screen is brighter than the periphery as required of a flat large-screen liquid crystal television.

Another object of the invention is to provide a light guide plate capable of reducing return light, which is light outgoing through the light incidence surfaces after it once enters the light guide plate, and outgoing light through the regions in the vicinities of the light incidence surfaces which is not used because the regions are covered with the housing, whereupon the use efficiency of outgoing light through the effective region of the light exit surface can be improved.

Still another object of the invention is to provide a light guide plate capable of sufficiently diffusing incident light in the vicinities of the light incidence surfaces to prevent outgoing light through the vicinities of the light incidence surfaces from having visible bright lines (dark lines, unevenness) which are attributable to such causes as intervals at which the light sources are disposed.

In order to achieve the above objects, the invention provides a light guide plate comprising: a rectangular light exit surface; at least one light incidence surface which is provided on at least one end side of the light exit surface and through which light enters; a rear surface on an opposite side from the light exit surface; and scattering particles dispersed in the light guide plate, wherein the light guide plate includes two or more layers superposed on each other in a direction substantially perpendicular to the light exit surface and containing the scattering particles at different particle concentrations, wherein the two or more layers include a first layer disposed on a side closer to the light exit surface and a second layer disposed on a side closer to the rear surface than the first layer and Npo and Npr satisfy a relationship expressed by Npr>Npo where Npo represents a particle concentration of the first layer and Npr represents a particle concentration of the second layer, wherein thicknesses of the first and second layers in the direction substantially perpendicular to the light exit surface change so that a combined particle concentration of the light guide plate has, in a direction perpendicular to the at least one light incidence surface, a first local maximum value on at least one side closer to the at least one light incidence surface and a second local maximum value located at a position farther from the at least one light incidence surface than at least one position of the first local maximum value and being larger than the first local maximum value, whereupon the thickness of the second layer continuously changes so that the second layer increases in thickness with increasing distance from the at least one light incidence surface, then decreases in thickness and subsequently increases in thickness again, and wherein an interface between the first layer and the second layer in a region corresponding to an area from the at least one position of the first local maximum value to a position of the second local maximum value includes at least one curved surface concave toward the light exit surface on at least one side on which the combined particle concentration takes the first local maximum value, and a curved surface smoothly connected to the at least one concave curved surface and convex toward the light exit surface on a side on which the combined particle concentration takes the second local maximum value such that the combined particle concentration smoothly changes from the at least one position of the first local maximum value to the position of the second local maximum value.

In the light exit surface, at least the region corresponding to the area from the at least one position of the first local maximum value to the position of the second local maximum value is preferably an effective screen area.

Preferably, the at least one light incidence surface comprises two light incidence surfaces provided on two opposite end sides of the light exit surface and the combined particle concentration has the first local maximum value on both sides closer to the two light incidence surfaces.

The second layer preferably has a maximum thickness at a central portion of the light exit surface.

Preferably, the at least one light incidence surface is provided on one end side of the light exit surface and the combined particle concentration has the first local maximum value at one position.

Npo and Npr preferably fall within ranges satisfying Npo=0 wt % and 0.01 wt %<Npr<0.8 wt %.

Alternatively, Npo and Npr preferably fall within ranges satisfying 0 wt %<Npo<0.15 wt % and Npo<Npr<0.8 wt %.

The rear surface is preferably a flat surface parallel to the light exit surface.

In order to achieve the above objects, the invention provides a planar lighting device comprising: the light guide plate described above; at least one light source disposed so as to face the at least one light incidence surface of the light guide plate; and a housing containing the light guide plate and the at least one light source and having an opening on a side closer to the light exit surface of the light guide plate, the opening being smaller than the light exit surface, wherein the first local maximum value of the combined particle concentration is located at a position corresponding to a vicinity of an edge of the opening of the housing.

According to the invention, the light guide plate has a thin shape, is high in light use efficiency, and is capable of emitting light with reduced unevenness in luminance and obtaining a so-called convex or bell-shaped brightness distribution, that is, such a distribution that an area around the center of the screen is brighter than the periphery as required of a flat large-screen liquid crystal television.

According to the invention, the scattering particle concentration in the vicinities of the light incidence surfaces can be reduced to decrease return light, which is light outgoing through the light incidence surfaces, and outgoing light through the regions in the vicinities of the light incidence surfaces which is not used because the regions are covered with the housing, whereupon the use efficiency of outgoing light through the effective region of the light exit surface can be improved.

According to the invention, the combined particle concentration has the first local maximum value in the vicinities of the light incidence surfaces and hence incident light through the light incidence surfaces can be sufficiently diffused to prevent bright lines (dark lines, unevenness), which are attributable to such causes as intervals at which the light sources are disposed, from occurring in the vicinities of the light incidence surfaces.

BRIEF DESCRIPTION OF THE DRAWINGS

FIGS. 20A, 20B and 20C are graphs showing the measurement results of the illuminance distribution of light emitted through the light exit surface of the light guide plate.

DETAILED DESCRIPTION OF THE INVENTION

A planar lighting device using a light guide plate according to the invention will be described below in detail with reference to preferred embodiments shown in the accompanying drawings.

Figure 1:
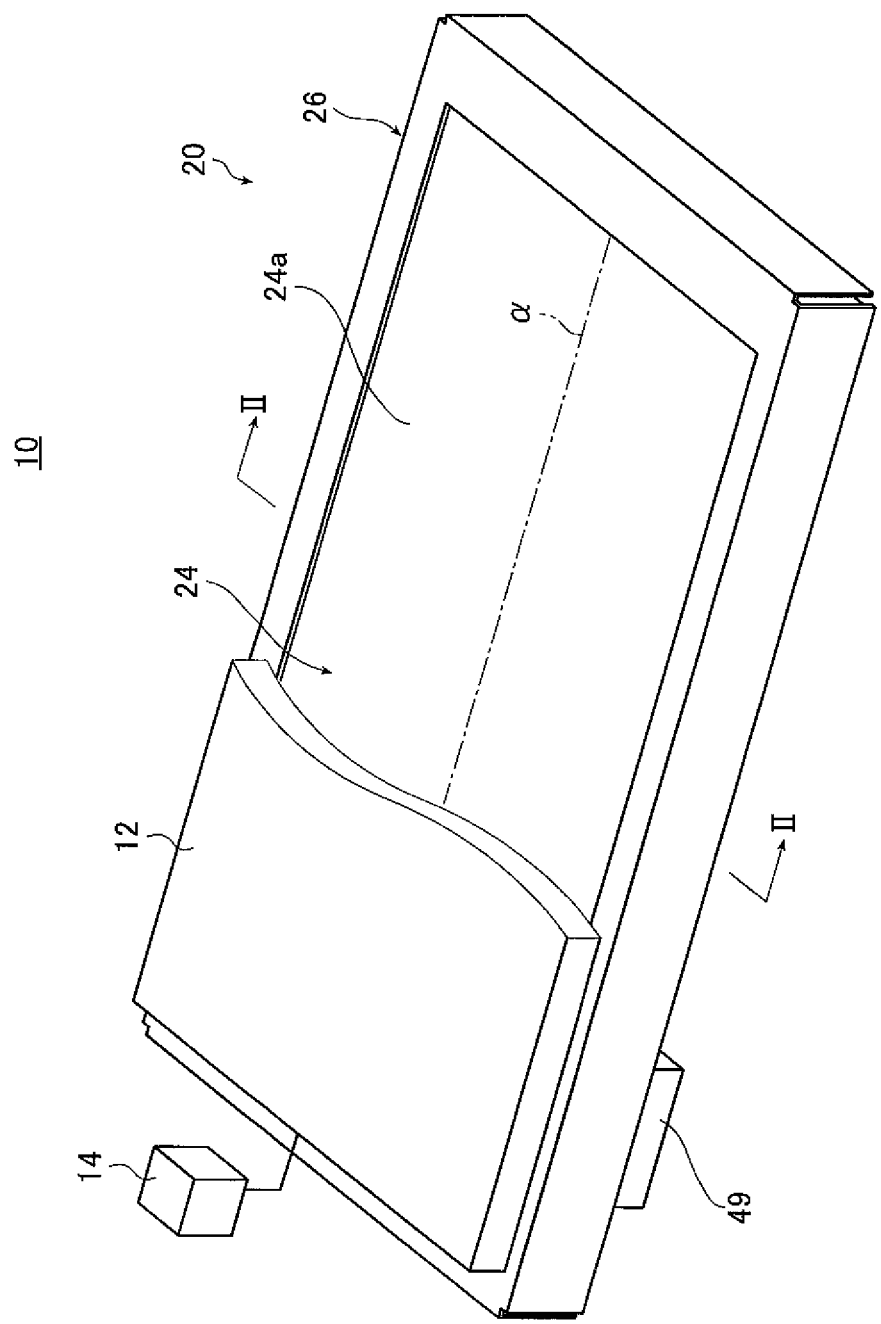
FIG. 1 is a schematic perspective view showing an embodiment of a liquid crystal display provided with a planar lighting device using a light guide plate according to the invention.
Figure 2:
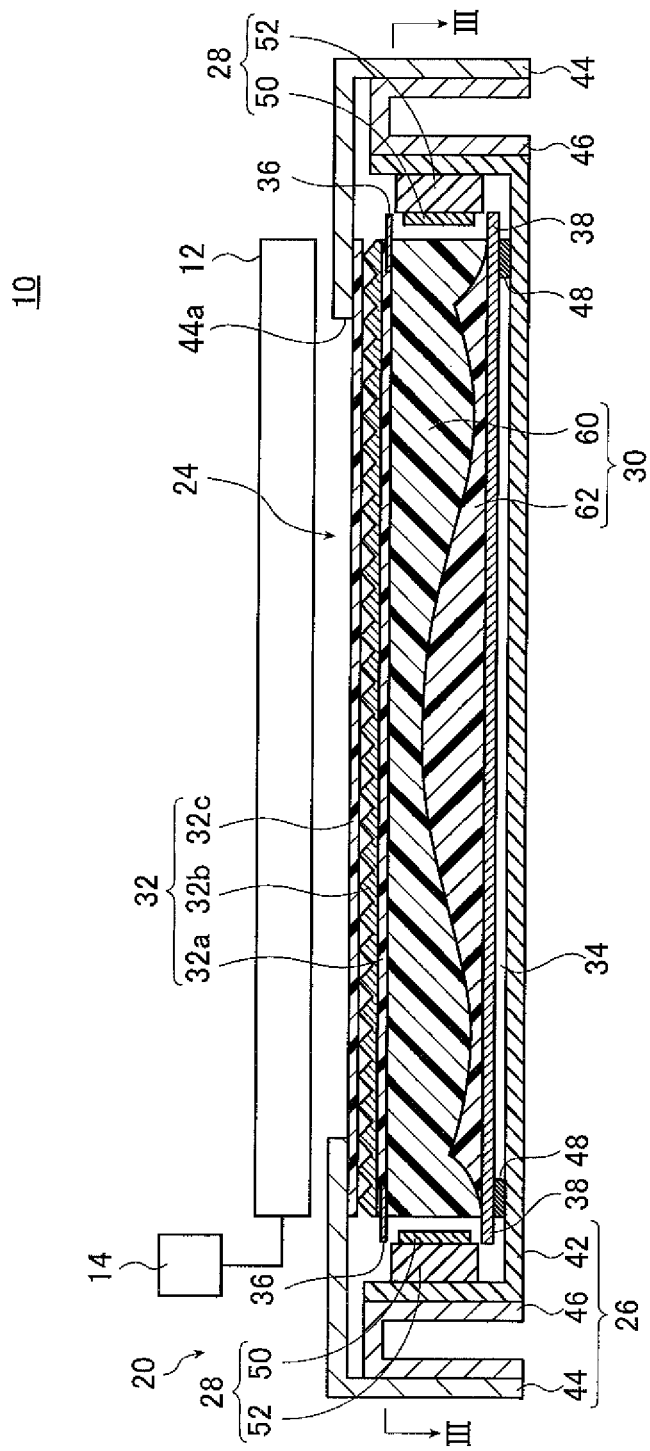
FIG. 2 is a cross-sectional view of the liquid crystal display shown in FIG. 1 taken along line II-II.

FIG. 1 is a perspective view schematically showing a liquid crystal display provided with the planar lighting device using the light guide plate according to the invention and FIG. 2 is a cross-sectional view of the liquid crystal display shown in FIG. 1 taken along line II-II.

Figure 3A:
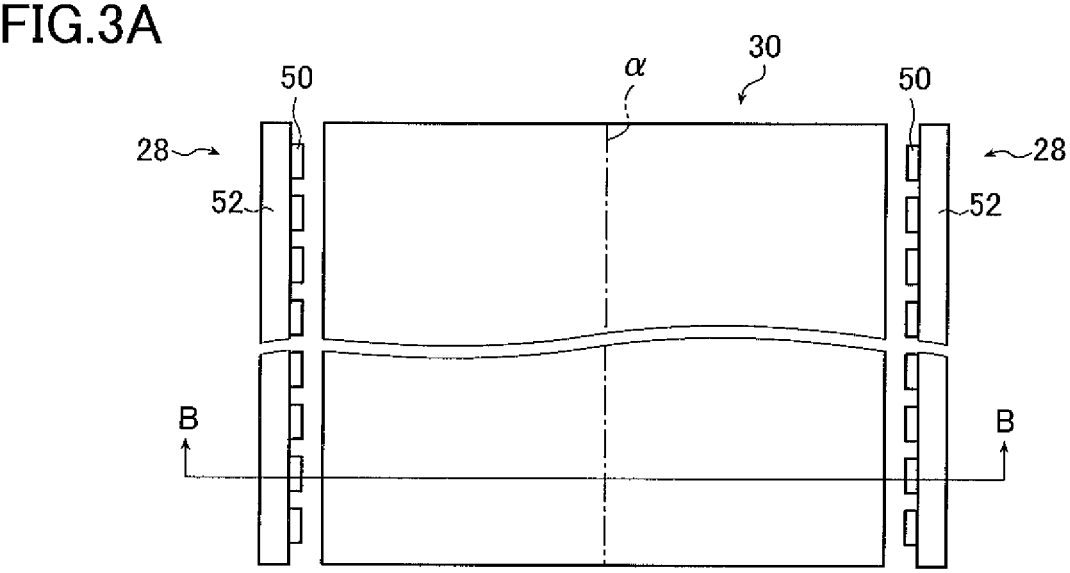
FIG. 3A is a view of the planar lighting device shown in FIG. 2 taken along line III-III and FIG. 3B is a cross sectional view of FIG. 3A taken along line B-B.
Figure 3B:
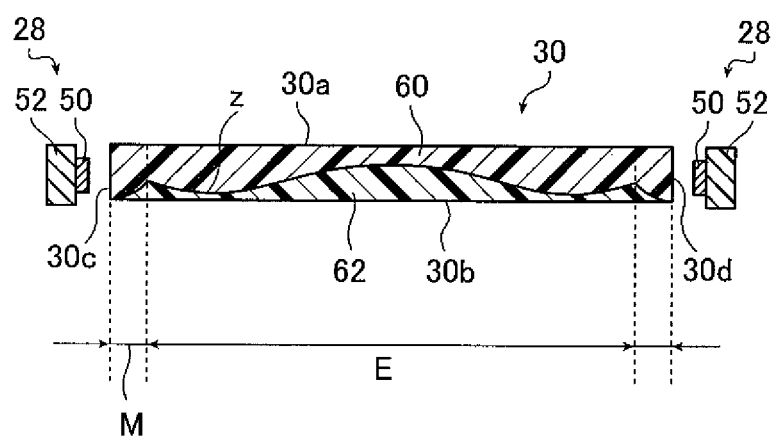

FIG. 3A is a view of the planar lighting device (also referred to below as "backlight unit") shown in FIG. 2 taken along line III-III and FIG. 3B is a cross-sectional view of FIG. 3A taken along line B-B.

A liquid crystal display 10 comprises a backlight unit 20, a liquid crystal display panel 12 disposed on the side closer to the light exit surface of the backlight unit 20, and a drive unit 14 for driving the liquid crystal display panel 12. In FIG. 1, part of the liquid crystal display panel 12 is not shown to illustrate the configuration of the backlight unit.

In the liquid crystal display panel 12, an electric field is partially applied to liquid crystal molecules previously arranged in a specified direction to thereby change the orientation of the molecules. The resultant changes in refractive index having occurred in the liquid crystal cells are used to display characters, figures, images and the like on the surface of the liquid crystal display panel 12.

The drive unit 14 applies a voltage to transparent electrodes in the liquid crystal display panel 12 to change the orientation of the liquid crystal molecules, thereby controlling the transmittance of light passing through the liquid crystal display panel 12.

The backlight unit 20 is a lighting device for illuminating the whole surface of the liquid crystal display panel 12 from behind the liquid crystal display panel 12 and comprises a light exit surface 24a of which the shape is substantially the same as an image display surface of the liquid crystal display panel 12.

As shown in FIGS. 1, 2, 3A and 3B, the backlight unit 20 according to this embodiment comprises a lighting device main body 24 having two light sources 28, a light guide plate 30 and an optical member unit 32, and a housing 26 having a lower housing 42, an upper housing 44, bent members 46 and support members 48. As shown in FIG. 1, a power unit casing 49 containing a plurality of power supplies for supplying the light sources 28 with electric power is provided on the back side of the lower housing 42 of the housing 26.

Components constituting the backlight unit 20 will be described below.

The lighting device main body 24 comprises the light sources 28 for emitting light, the light guide plate 30 for emitting the light from the light sources 28 as planar light, and the optical member unit 32 for scattering and diffusing the light emitted from the light guide plate 30 to further reduce the unevenness of the light.

First, the light sources 28 will be described.

Figure 4A:
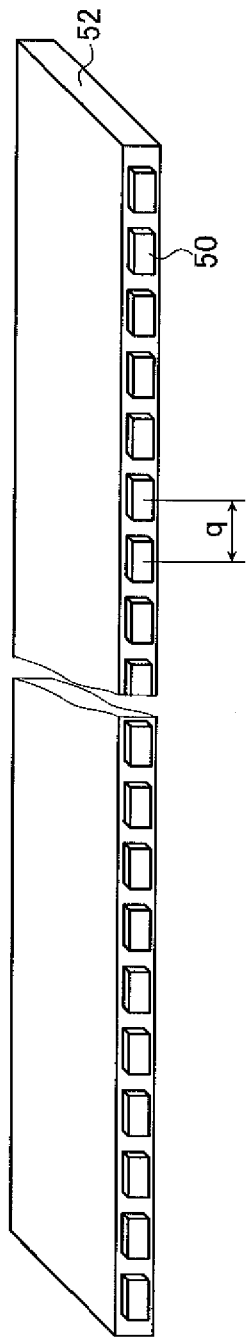
FIG. 4A is a perspective view showing the schematic configuration of a light source of the planar lighting device shown in FIGS. 1 and 2.
Figure 4B:
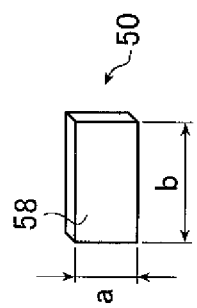
FIG. 4B is an enlarged schematic perspective view showing one of LEDs forming the light source shown in FIG. 4A.

FIG. 4A is a schematic perspective view schematically showing the configuration of the light source 28 of the backlight unit 20 shown in FIGS. 1 and 2. FIG. 4B is an enlarged schematic perspective view showing only one LED chip of the light source 28 shown in FIG. 4A.

As shown in FIG. 4A, the light source 28 comprises a plurality of light emitting diode chips (referred to below as "LED chips") 50 and a light source support 52.

The LED chip 50 is a chip of a light emitting diode emitting blue light, which has a phosphor applied on the surface thereof. It has a light-emitting face 58 with a predetermined area through which white light is emitted.

Specifically, when blue light emitted through the surface of the light emitting diode of the LED chip 50 passes through the phosphor, the phosphor emits fluorescence. Thus, the blue light emitted from the light emitting diode is combined with the light emitted as a result of the fluorescence of the phosphor to produce white light, which is emitted from the LED chip 50.

An example of the LED chip 50 includes a chip obtained by applying a YAG (yttrium aluminum garnet) phosphor to the surface of a GaN light emitting diode, an InGaN light emitting diode, and the like.

The light source support 52 is a plate member disposed so that one surface thereof faces a light incidence surface 30c or 30d of the light guide plate 30.

The light source support 52 carries the LED chips 50 on its lateral surface facing the light incidence surface (30c or 30d) of the light guide plate 30 so that the LED chips 50 are spaced apart from each other at predetermined intervals. More specifically, the LED chips 50 constituting the light source 28 are arrayed along the longitudinal direction of the first light incidence surface 30c or the second light incidence surface 30d of the light guide plate 30 to be described later and are secured onto the light source support 52. In other words, the LED chips 50 are arrayed parallel to a line in which the first light incidence surface 30c or the second light incidence surface 30d meets a light exit surface 30a, and are secured onto the light source support 52.

The light source support 52 is formed of a metal having high heat conductivity such as copper or aluminum and also serves as a heat sink which absorbs heat generated from the LED chips 50 and releases the generated heat to the outside. The light source support 52 may be equipped with fins capable of increasing the surface area and the heat dissipation effect or heat pipes for transferring heat to a heat dissipating member.

As shown in FIG. 4B, the LED chips 50 according to this embodiment each have such a rectangular shape that the sides in a direction perpendicular to the direction in which the LED chips 50 are arrayed are shorter than the sides lying in the direction in which the LED chips 50 are arrayed, that is, the sides lying in the direction of thickness of the light guide plate 30 to be described later (the direction perpendicular to the light exit surface 30a) are shorter sides. In other words, the LED chips 50 each have a shape satisfying b>a where "a" denotes the length of the side in a direction perpendicular to the light exit surface 30a of the light guide plate 30 and "b" denotes the length of the side in the array direction. Now, given "q" as the distance by which the arrayed LED chips 50 are spaced apart from each other, then q>b holds. Thus, the length "a" of the side of the LED chips 50 perpendicular to the light exit surface 30a of the light guide plate 30, the length "b"

of the side in the array direction, and the distance "q" by which the LED chips 50 are spaced apart from each other preferably have a relationship satisfying q>b>a.

The LED chips 50 each having a rectangular shape allow a thinner design of the light source to be achieved while keeping the output of a large amount of light. A thinner light source 28, in turn, permits the reduction of the thickness of the backlight unit. Further, the number of LED chips that need to be arranged can be reduced.

While the LED chips 50 each preferably have a rectangular shape with the shorter sides lying in the direction of the thickness of the light guide plate 30 for a thinner design of the light source 28, the invention is not limited thereto and LED chips having various shapes including a square shape, a circular shape, a polygonal shape and an elliptical shape may be used.

Next, the light guide plate 30 will be described.

Figure 5:
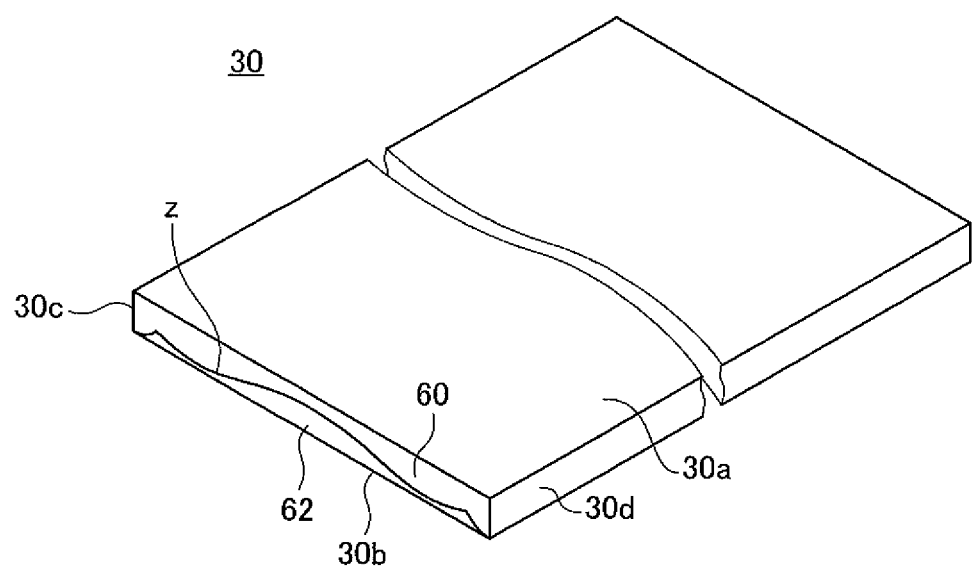
FIG. 5 is a schematic perspective view showing the shape of the light guide plate shown in FIGS. 3A and 3B.

FIG. 5 is a schematic perspective view showing the shape of the light guide plate.

As shown in FIGS. 2, 3A, 3B and 5, the light guide plate 30 includes the rectangular light exit surface 30a; the two light incidence surfaces (the first light incidence surface 30c and the second light incidence surface 30d) formed at both ends on the longer sides of the light exit surface 30a and substantially perpendicular to the light exit surface 30a; and a flat rear surface 30b located on the opposite side from the light exit surface 30a, that is, on the back side of the light guide plate 30.

The two light sources 28 mentioned above are disposed so as to face the first light incidence surface 30c and the second light incidence surface 30d of the light guide plate 30, respectively. In this embodiment, the light-emitting face 58 of each LED chip 50 in the light sources 28 has substantially the same length as the first light incidence surface 30c and the second light incidence surface 30d in the direction substantially perpendicular to the light exit surface 30a.

Thus, the backlight unit 20 has the two light sources 28 disposed so as to sandwich the light guide plate 30 therebetween. In other words, the light guide plate 30 is disposed between the two light sources 28 so that the former faces the latter at a predetermined distance from each other.

The light guide plate 30 is formed by kneading and dispersing scattering particles for light scattering into a transparent resin. Exemplary materials of the transparent resin that may be used for the light guide plate 30 include optically transparent resins such as PET (polyethylene terephthalate), PP (polypropylene), PC (polycarbonate), PMMA (polymethyl methacrylate), benzyl methacrylate, MS resin, and COP (cycloolefin polymer). Silicone particles (e.g., TOSPEARL (registered trademark)) and other particles made of silica, zirconia and a dielectric polymer may be used for the scattering particles to be kneaded and dispersed in the light guide plate 30.

The light guide plate 30 is of a two-layer structure including a first layer 60 on the side closer to the light exit surface 30a and a second layer 62 on the side closer to the rear surface 30b. When the boundary between the first layer 60 and the second layer 62 is referred to as "interface z", the first layer 60 has a sectional region surrounded by the light exit surface 30a, the first light incidence surface 30c, the second light incidence surface 30d and the interface z. On the other hand, the second layer 62 is a layer adjacent to the first layer on the side closer to the rear surface 30b and has a sectional region surrounded by the interface z and the rear surface 30b.

Now, the particle concentration of the scattering particles in the first layer 60 and that of the scattering particles in the second layer 62 are denoted by Npo and Npr, respectively.

Then, Npo and Npr have a relationship expressed by Npo<Npr. Thus, in the light guide plate 30, the second layer on the side closer to the rear surface 30b contains the scattering particles at a higher particle concentration than the first layer on the side closer to the light exit surface 30a.

When seen from the cross section perpendicular to the longitudinal direction of the light incidence surface, the interface z between the first layer 60 and the second layer 62 continuously changes so that the second layer 62 decreases in thickness from the light exit surface 30a at the bisector α (i.e., the central portion of the light exit surface 30a) toward the first light incidence surface 30c and the second light incidence surface 30d, then increases in thickness in the vicinities of the light incidence surface 30c and the second light incidence surface 30d, and then continuously changes so that the second layer 62 decreases in thickness again.

More specifically, the interface z includes a curved surface convex toward the light exit surface 30a in the central portion of the light guide plate 30, concave curved surfaces smoothly connected to the convex curved surface, and concave curved surfaces connected to the concave curved surfaces and communicating with ends of the light incidence surfaces 30c and 30d on the side closer to the rear surface 30b. The thickness of the second layer 62 at the light incidence surfaces 30c and 30d is zero.

By thus continuously changing the thickness of the second layer containing scattering particles at a higher particle concentration than that in the first layer 60 such that the second layer has a first local maximum value as a result of an increased thickness in the vicinities of the light incidence surfaces and a second local maximum value at the central portion of the light guide plate having the largest thickness, the combined particle concentration of the scattering particles is changed so as to have the first local maximum value in the vicinity of each of the first and second light incidence surfaces (30c and 30d) and the second local maximum value at the central portion of the light guide plate, the second local maximum value being larger than the first local maximum value.

The combined particle concentration as used herein denotes a concentration of scattering particles expressed using the amount of scattering particles added or combined in a direction substantially perpendicular to the light exit surface at a position spaced apart from one light incidence surface toward the other on the assumption that the light guide plate is a flat plate having the thickness at the light incidence surfaces throughout the light guide plate. In other words, the combined particle concentration denotes a quantity per unit volume of scattering particles or a weight percentage with respect to the base material of scattering particles added in a direction substantially perpendicular to the light exit surface at a position spaced apart from the light incidence surface on the assumption that the light guide plate is a flat light guide plate which has the thickness at the light incidence surfaces throughout the light guide plate and in which the concentration is the same.

The first local maximum value in the thickness of the second layer 62 (combined particle concentration) is located at the edge of an opening 44a of the upper housing 44 (FIG. 2). The regions from the light incidence surfaces 30c and 30d to their corresponding positions of the first local maximum value are located outside the opening 44a of the upper housing 44, that is, in the frame portion forming the opening 44a, and therefore does not contribute to the emission of light as the backlight unit 20. In other words, the regions from the light incidence surfaces 30c and 30d to their corresponding positions of the first local maximum value are so-called mixing zones M for diffusing light having entered through the light incidence surfaces. The region which is closer to the central portion of the light guide plate than the mixing zones M, that is, the region corresponding to the opening 44a of the upper housing 44 is an effective screen area E and is a region contributing to the emission of light as the backlight unit 20.

By thus adjusting the combined particle concentration of the light guide plate 30 (thickness of the second layer) so that the concentration has the second local maximum value which is the largest in the central portion of the light guide plate, incident light through the light incidence surfaces 30c and 30d can travel to positions farther from the light incidence surfaces 30c and 30d even if the light guide plate is large and thin, whereupon outgoing light may have a luminance distribution which is high in the middle.

By adjusting the combined particle concentration so as to have the first local maximum value in the vicinities of the light incidence surfaces 30c and 30d, incident light through the light incidence surfaces 30c and 30d can be sufficiently diffused in the vicinities of the light incidence surfaces to prevent outgoing light through the vicinities of the light incidence surfaces from having visible bright lines (dark lines, unevenness) which are attributable to such causes as intervals at which the light sources are disposed.

By adjusting the combined particle concentration so that the regions on the sides closer to the light incidence surfaces 30c and 30d than the positions where the combined particle concentration takes the first local maximum value have a lower combined particle concentration than the first local maximum value, return light, which is light outgoing through the light incidence surfaces after it once enters the light guide plate, and outgoing light through the regions in the vicinities of the light incidence surfaces (mixing zones M) which is not used because the regions are covered with the housing can be reduced to improve the use efficiency of outgoing light through the effective region of the light exit surface (effective screen area E).

By setting the positions where the combined particle concentration takes the first local maximum value on the sides closer to the light incidence surfaces 30c and 30d from the opening 44a of the upper housing 44, outgoing light through the regions in the vicinities of the light incidence surfaces (mixing zones M) which is not used because the regions are covered with the housing can be reduced to improve the use efficiency of outgoing light through the effective region of the light exit surface (effective screen area E).

The adjustment of the shape of the interface z enables the luminance distribution (concentration distribution of the scattering particles) as well to be set as desired to improve the efficiency to the maximum extent possible.

In addition, since the particle concentration of the layer on the side closer to the light exit surface (first layer) is reduced, the total amount of the scattering particles used can be reduced, thus leading to cost reduction.

In the illustrated embodiment, the combined particle concentration is adjusted so as to have the first local maximum value at the edge of the opening 44a of the upper housing 44. However, this is not the sole case of the invention and the combined particle concentration may have the first local maximum value at positions inside the opening 44a or in the frame portion of the surface of the upper housing 44 having the opening 44a (outside the opening 44a) as long as the first local maximum value of the combined particle concentration is located near the edge of the opening 44a of the upper housing 44. In other words, the combined particle concentration may have the first local maximum value at positions in the effective screen area E or at positions in the mixing zones M.

Although the light guide plate 30 is divided into the first layer 60 and the second layer 62 by the interface z, the first layer 60 and the second layer 62 are obtained by dispersing the same scattering particles in the same transparent resin and have an integrated structure, the only difference being the particle concentration. That is, the light guide plate 30 has different particle concentrations in the respective regions on both sides of the interface z which serves as a reference but the interface z is a virtual face and the first layer 60 is integrated with the second layer 62.

The light guide plate 30 as described above may be manufactured using an extrusion molding method or an injection molding method.

In the light guide plate 30 shown in FIG. 2, light emitted from the light sources 28 and allowed to enter the light guide plate 30 through the first light incidence surface 30c and the second light incidence surface 30d is scattered by scatterers (scattering particles) contained inside the light guide plate 30 as it travels through the inside of the light guide plate 30, and is emitted through the light exit surface 30a directly or after having been reflected by the rear surface 30b. Then, part of light may leak through the rear surface 30b but the light which leaked out is then reflected by a reflector 34 disposed on the side of the light guide plate 30 closer to the rear surface 30b to enter the light guide plate 30 again. The reflector 34 will be described later in detail.

Further, the particle concentration Npo of the scattering particles in the first layer 60 and the particle concentration Npr of the scattering particles in the second layer 62 preferably satisfy the relationships of 0 wt %<Npo<0.15 wt % and Npo<Npr<0.8 wt %.

If the first layer 60 and the second layer 62 of the light guide plate 30 satisfy the above relationships, the light guide plate 30 can guide the incident light to the inside (center) of the light guide plate 30 without scattering it so much in the first layer 60 having a lower particle concentration, and the light is scattered by the second layer having a higher particle concentration as it approaches the center of the light guide plate, thus enabling the amount of light emitted through the light exit surface 30a to be increased. In brief, the illuminance distribution which is high in the middle at a preferable ratio can be obtained while further enhancing the light use efficiency.

The particle concentration [wt %] as used herein denotes a ratio of the weight of the scattering particles to the weight of the base material.

Further, the particle concentration Npo of the scattering particles in the first layer 60 and the particle concentration Npr of the scattering particles in the second layer 62 preferably satisfy the relationships of Npo=0 wt % and 0.01 wt %<Npr<0.8 wt %. In other words, the light guide plate may be configured such that the scattering particles are not dispersed in the first layer 60 by kneading to guide incident light deep into the light guide plate 30, and the scattering particles are only kneaded and dispersed in the second layer 62 to scatter the light more as it comes closer to the center of the light guide plate, thereby increasing the amount of light emitted through the light exit surface 30a.

Since the first layer 60 and the second layer 62 of the light guide plate 30 satisfy the above relationships, the illuminance distribution which is high in the middle at a preferable ratio can be obtained while further enhancing the light use efficiency.

The thickness of the light guide plate of the invention is not particularly limited. The light guide plate may be several millimeters in thickness or may be a so-called light guide sheet which is a film with a thickness of 1 mm or less. A film-like light guide plate having two layers which contain scattering particles kneaded and dispersed therein at different particle concentrations may be produced by a method which involves forming as the first layer a base film containing scattering particles by extrusion molding or other process, applying a monomer resin liquid (transparent resin liquid) having scattering particles dispersed therein to the formed base film, and irradiating the base film with ultraviolet light or visible light to cure the monomer resin liquid to thereby form the second layer having a desired particle concentration, thus producing a film-like light guide plate. Alternatively, the film-like light guide plate may be produced by two-layer extrusion molding.

Also in cases where the light guide plate is a film-like light guide sheet with a thickness of 1 mm or less, formation of the light guide plate with two layers enables the illuminance distribution which is high in the middle at a preferable ratio to be obtained while further enhancing the light use efficiency.

In the illustrated light guide plate 30, the interface z has such a shape as to form a curved surface which is concave toward the light exit surface 30a in each of the regions from the positions of the first local maximum value to their corresponding light incidence surfaces 30c and 30d, and which communicates with ends of the light incidence surfaces 30c and 30d closer to the rear surface 30b. However, the invention is not limited thereto.

FIGS. 6A to 6E are schematic views showing other examples of the light guide plate of the invention.

Each of light guide plates 100, 110, 120, 130 and 140 shown in FIGS. 6A to 6E has the same configuration as the light guide plate 30 shown in FIGS. 3A and 3B except that the thickness of each of the first and second layers in the mixing zones M, that is, the shape of the interface z in the portions from the light incidence surfaces 30c and 30d to the positions of the first local maximum value is changed. Therefore, like elements are denoted by the same reference numerals and the following description mainly focuses on the distinctive portions.

Figure 6:
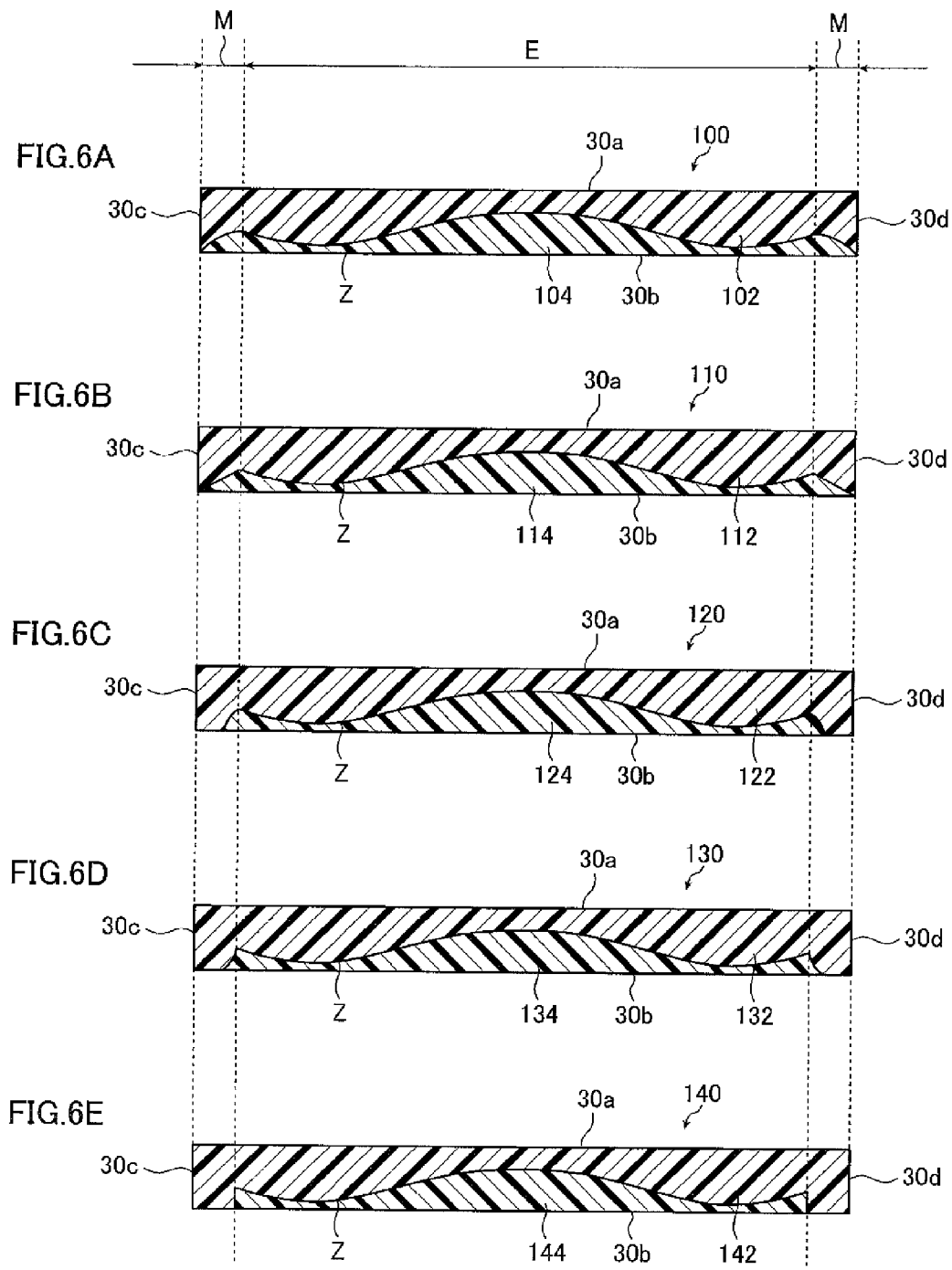
FIGS. 6A to 6E are schematic cross-sectional views showing other examples of the light guide plate of the invention.

A light guide plate 100 shown in FIG. 6A includes a first layer 102 and a second layer 104 having a higher particle concentration than the first layer 102. In the mixing zones M, the interface z between the first layer 102 and the second layer 104 has such a shape as to include curved surfaces which communicate with the positions of the first local maximum value, are convex toward the light exit surface 30a, and communicate with ends of the light incidence surfaces 30c and 30d closer to the rear surface 30b.

A light guide plate 110 shown in FIG. 6B includes a first layer 112 and a second layer 114 having a higher particle concentration than the first layer 112. In the mixing zones M, the interface z between the first layer 112 and the second layer 114 includes flat surfaces connecting the positions of the first local maximum value to ends of the light incidence surfaces 30c and 30d closer to the rear surface 30b.

A light guide plate 120 shown in FIG. 6C includes a first layer 122 and a second layer 124 having a higher particle concentration than the first layer 122. In the mixing zones M, the interface z between the first layer 122 and the second layer 124 has such a shape as to include curved surfaces which communicate with the positions of the first local maximum value, are convex toward the light exit surface 30a, and communicate with the rear surface 30b substantially in the middle of the mixing zones M.

A light guide plate 130 shown in FIG. 6D includes a first layer 132 and a second layer 134 having a higher particle concentration than the first layer 132. In the mixing zones M, the interface z between the first layer 132 and the second layer 134 has such a shape as to include curved surfaces which communicate with the positions of the first local maximum value, are concave toward the light exit surface 30a, and communicate with the rear surface 30b substantially in the middle of the mixing zones M.

A light guide plate 140 shown in FIG. 6E includes a first layer 142 and a second layer 144 having a higher particle concentration than the first layer 142. In the mixing zones M, the light guide plate 140 only includes the first layer 142. In other words, the interface z has such a shape as to include flat surfaces passing through the positions of the first local maximum value and parallel to the light incidence surfaces 30c and 30d.

By forming the interface z so as to have such a shape that the second layer decreases in thickness from the positions of the first local maximum value toward the light incidence surfaces 30c and 30d as in the light guide plates shown in FIGS. 6A to 6E, the regions from the positions of the first local maximum value to the light incidence surfaces 30c and 30d (mixing zones M) can be adjusted to have a lower combined particle concentration than the first local maximum value to reduce return light, which is light outgoing through the light incidence surfaces after it once enters the light guide plate, and outgoing light through the regions in the vicinities of the light incidence surfaces (mixing zones M) which is not used because the regions are covered with the housing, whereupon the use efficiency of outgoing light through the effective region of the light exit surface (effective screen area E) can be improved.

In a cross section perpendicular to the longitudinal direction of the light incidence surface, the concave curved surface and the convex curved surface which form the interface z may be curves expressed by part of a circle or an ellipse, quadratic curves, curves expressed by polynomials, or curves obtained by combination thereof.

The light exit surface 30a is flat in the light guide plate 30 shown in FIG. 2. However, this is not the sole case and the light exit surface 30a may be concave. The light exit surface having a concave shape can prevent the light guide plate from warping toward the light exit surface side upon expansion or contraction of the light guide plate due to heat and humidity, thus from touching the liquid crystal display 12.

The rear surface 30b is flat in the light guide plate 30 shown in FIG. 2. However, this is not the sole case and the rear surface may be a concave surface, that is, a surface inclined in directions in which the thickness decreases with increasing distance from the light incidence surfaces. Alternatively, the rear surface 30b may be a convex surface, that is, a surface inclined in directions in which the thickness increases with increasing distance from the light incidence surfaces.

Next, the optical member unit 32 will be described.

The optical member unit 32 is provided to reduce the luminance unevenness and illuminance unevenness of illumination light emitted through the light exit surface 30a of the light guide plate 30 before emitting the light through the light exit surface 24a of the lighting device main body 24. As shown in FIG. 2, the optical member unit 32 comprises a diffusion sheet 32a for diffusing the illumination light emitted through the light exit surface 30a of the light guide plate 30 to reduce the luminance unevenness and illuminance unevenness; a prism sheet 32b having microprism arrays formed thereon parallel to the lines where the light exit surface 30a and the light incidence surfaces 30c, 30d meet; and a diffusion sheet 32c for diffusing the illumination light emitted through the prism sheet 32b to reduce the luminance unevenness and the illuminance unevenness.

There is no particular limitation on the diffusion sheets 32a and 32c and the prism sheet 32b, and known diffusion sheets and prism sheets may be used. For example, use may be made of the diffusion sheets and the prism sheets disclosed in paragraphs [0028] through [0033] of commonly assigned JP 2005-234397 A.

While the optical member unit in the embodiment under discussion comprises the two diffusion sheets 32a and 32c and the prism sheet 32b disposed between the two diffusion sheets, there is no particular limitation on the order in which the prism sheet and the diffusion sheets are arranged or the number of the sheets to be used. The materials of the prism sheet and the diffusion sheets are also not particularly limited, and use may be made of various optical members, as long as they can further reduce the unevenness in luminance and illuminance of the illumination light emitted through the light exit surface 30a of the light guide plate 30.

For example, the optical members used in addition to or instead of the above-described diffusion sheets and prism sheet may be transmittance adjusting members in which a large number of transmittance adjusters consisting of diffusion reflectors are disposed according to the luminance unevenness and the illuminance unevenness. Further, the optical member unit may be of a two-layer structure including one prism sheet and one diffusion sheet or including two diffusion sheets only.

Next, the reflector 34 of the lighting device main body 24 will be described.

The reflector 34 is provided to reflect light leaking through the rear surface 30b of the light guide plate 30 back into the light guide plate 30 and helps enhance the light use efficiency. The reflector 34 has a shape corresponding to the rear surface 30b of the light guide plate 30 and is formed so as to cover the rear surface 30b. In this embodiment, the reflector 34 is formed into a shape contouring the profile of the rear surface 30b of the light guide plate 30 having a flat plane, that is, having a linear shape in cross section as shown in FIG. 2.

The reflector 34 may be formed of any material, as long as it can reflect light leaking through the rear surface 30b of the light guide plate 30. The reflector 34 may be formed, for example, of a resin sheet produced by kneading a filler with PET or PP (polypropylene) and then drawing the resultant mixture to form voids therein for increased reflectance; a sheet with a specular surface formed by, for example, aluminum vapor deposition on the surface of a transparent or white resin sheet; a metal foil such as an aluminum foil or a resin sheet carrying a metal foil; or a thin metal sheet having a sufficient reflectivity on the surface.

Upper light guide reflectors 36 are disposed between the light guide plate 30 and the diffusion sheet 32a, i.e., on the side closer to the light exit surface 30a of the light guide plate 30, so as to cover the light sources 28 and the end portions of the light exit surface 30a of the light guide plate 30 (i.e., the end portion on the side closer to the first light incidence surface 30c and the end portion on the side closer to the second light incidence surface 30d). In other words, each upper light guide reflector 36 is disposed so as to cover an area extending from part of the light exit surface 30a of the light guide plate 30 to part of the light source support 52 of the light source 28 in a direction parallel to the direction of the optical axis. Briefly, the two upper light guide reflectors 36 are disposed at both end portions of the light guide plate 30, respectively.

By thus providing the upper light guide reflectors 36, light emitted from the light sources 28 can be prevented from failing to enter the light guide plate 30 and leaking toward the light exit surface 30a.

Thus, light emitted from the light sources 28 can efficiently enter the light guide plate 30 through the first light incidence surface 30c and the second light incidence surface 30d of the light guide plate 30 to enhance the light use efficiency.

Lower light guide reflectors 38 are disposed on the side closer to the rear surface 30b of the light guide plate 30 so as to cover part of the light sources 28. Ends of the lower light guide reflectors 38 closer to the center of the light guide plate 30 are connected to the reflector 34.

The upper light guide reflectors 36 and the lower light guide reflectors 38 may be formed of any of the above-mentioned various materials used to form the reflector 34.

By providing the lower light guide reflectors 38, light emitted from the light sources 28 can be prevented from failing to enter the light guide plate 30 and leaking toward the rear surface 30b of the light guide plate 30.

Thus, light emitted from the light sources 28 can efficiently enter the light guide plate 30 through the first light incidence surface 30c and the second light incidence surface 30d of the light guide plate 30 to enhance the light use efficiency.

While the reflector 34 is connected to the lower light guide reflectors 38 in the embodiment under discussion, this is not the sole case and they may be used as separate members.

The shapes and the widths of the upper light guide reflectors 36 and the lower light guide reflectors 38 are not particularly limited as long as light emitted from the light sources 28 can be reflected toward and allowed to enter through the first light incidence surface 30c or the second light incidence surface 30d and the light having entered the light guide plate 30 can be guided to the central side of the light guide plate 30.

In the embodiment under discussion, the upper light guide reflectors 36 are disposed between the light guide plate 30 and the diffusion sheet 32a. However, the upper light guide reflectors 36 may be disposed at any position without particular limitation. It may be disposed between the sheet members constituting the optical member unit 32 or between the optical member unit 32 and the upper housing 44.

Next, the housing 26 will be described.

As shown in FIG. 2, the housing 26 accommodates and supports the lighting device main body 24 and holds and secures the lighting device main body 24 from the side closer to the light exit surface 24a and the side closer to the rear surface 30b of the light guide plate 30. The housing 26 comprises the lower housing 42, the upper housing 44, the bent members 46 and the support members 48.

The lower housing 42 is open at the top and has a shape formed by a bottom section and lateral sections provided upright on the four sides of the bottom section. In brief, it is substantially in the shape of a rectangular box open on one side. As shown in FIG. 2, the lower housing 42 supports the lighting device main body 24 placed therein from above on the bottom section and the lateral sections and covers the faces of the lighting device main body 24 except the light exit surface 24a, i.e., the face opposite from the light exit surface 24a of the lighting device main body 24 (rear surface) and the lateral faces.

The upper housing 44 has the shape of a rectangular box; it has at the top a rectangular opening which is smaller than the rectangular light exit surface 24a of the lighting device main body 24 and is open at the bottom.

As shown in FIG. 2, the upper housing 44 is placed from above the lighting device main body 24 and the lower housing 42 (from the light exit surface side) to cover the lighting device main body 24 and the lower housing 42 holding the main body therein, including the four lateral sections.

The bent members 46 have a concave (U-shaped) sectional profile that is always identical throughout their length. That is, each bent member 46 is a bar-shaped member having a U-shaped profile in cross section perpendicular to the direction in which they extends.

As shown in FIG. 2, the bent members 46 are fitted between the lateral faces of the lower housing 42 and the lateral faces of the upper housing 44 such that the outer face of one of the parallel sections of the U-shaped member is connected with the lateral section of the lower housing 42 whereas the outer face of the other parallel section is connected with the lateral section of the upper housing 44.

Various known methods including a method using bolts and nuts and a method using an adhesive may be used to connect the lower housing 42 with the bent members 46 and the bent members 46 with the upper housing 44.

By thus providing the bent members 46 between the lower housing 42 and the upper housing 44, the rigidity of the housing 26 can be increased to prevent the light guide plate 30 from warping. As a result, for example, light having no or reduced luminance unevenness and illuminance unevenness can be efficiently emitted. Further, even in cases where the light guide plate used is liable to develop a warp, the warp can be corrected more reliably or the warping of the light guide plate can be prevented more reliably, thereby allowing light having no or reduced luminance unevenness and illuminance unevenness to be emitted through the light exit surface.

Various materials such as metals and resins may be used to form the upper housing, the lower housing and the bent members of the housing. The material used is preferably light in weight and very strong.

While the bent members are provided as separate members in the embodiment under discussion, they may be integrated with the upper housing or the lower housing. Alternatively, the housing may not have the bent members.

The support members 48 are rod members each having an identical shape in cross section perpendicular to the direction in which they extend.

As shown in FIG. 2, the support members 48 are provided between the reflector 34 and the lower housing 42, more specifically, between the reflector 34 and the lower housing 42 at positions corresponding to the ends of the rear surface 30b of the light guide plate 30 on the sides closer to the first light incidence surface 30c and the second light incidence surface 30d, respectively. The support members 48 thus secure the light guide plate 30 and the reflector 34 to the lower housing 42 and support them.

The light guide plate 30 can be brought into close contact with the reflector 34 by supporting the reflector 34 with the support members 48. Furthermore, the light guide plate 30 and the reflector 34 can be secured to the lower housing 42 at predetermined positions.

While the support members are provided as separate members in the embodiment under discussion, the invention is not limited thereto and they may be integrated with the lower housing 42 or the reflector 34. To be more specific, projections may be formed in part of the lower housing 42 to serve as support members or projections may be formed in part of the reflector 34 to serve as support members.

The location of the support members is also not particularly limited and they may be provided at any positions between the reflector and the lower housing. However, to stably hold the light guide plate, the support members are preferably provided on the end sides of the light guide plate, that is, near the first light incidence surface 30c and the second light incidence surface 30d in the embodiment under discussion.

The shape of the support members 48 is not particularly limited and the support members 48 may have any of various shapes. The support members 48 may also be formed of various materials. For example, two or more support members may be provided at predetermined intervals.

Further, the support members may have such a shape as to fill the whole space formed by the reflector and the lower housing. More specifically, the support members may have such a shape that the side thereof facing the reflector has a contour following the surface of the reflector and the side thereof facing the lower housing has a contour following the surface of the lower housing. In cases where the whole surface of the reflector is supported by the support members, the reflector can be reliably prevented from being separated from the light guide plate, and light reflected by the reflector can be prevented from causing luminance unevenness and illuminance unevenness.

The backlight unit 20 is basically configured as described above.

In the backlight unit 20, light emitted from the light sources 28 provided on both sides of the light guide plate 30 enters through the light incidence surfaces (the first light incidence surface 30c and the second light incidence surface 30d) of the light guide plate 30. The incident light through the respective surfaces is scattered by scatterers contained inside the light guide plate 30 as the light travels inside the light guide plate 30 and is emitted through the light exit surface 30a directly or after being reflected by the rear surface 30b. Then, part of the light leaking through the rear surface is reflected by the reflector 34 to enter the light guide plate 30 again.

Thus, light emitted through the light exit surface 30a of the light guide plate 30 is transmitted through the optical member 32 and emitted through the light exit surface 24a of the lighting device main body 24 to illuminate the liquid crystal display panel 12.

The liquid crystal display panel 12 uses the drive unit 14 to control the light transmittance according to the position so as to display characters, figures, images, etc. on the surface of the liquid crystal display panel 12.

Although each of the light guide plates according to the above embodiments is of a type comprising two light sources disposed on two light incidence surfaces so that light enters from both sides of the light guide plate, the invention is not limited thereto; the light guide plate may be of a type comprising only one light source disposed on one light incidence surface so that light enters from one side of the light guide plate. Reduction in number of light sources enables the number of parts and hence the costs to be reduced.

In cases where light is allowed to enter from one side of the light guide plate, the interface z may have an asymmetric shape. For example, the light guide plate may have one light incidence surface and include a second layer which has such an asymmetric shape that the second layer has a maximum thickness at a position far from the light incidence surface beyond the bisector of the light exit surface.

Figure 7:
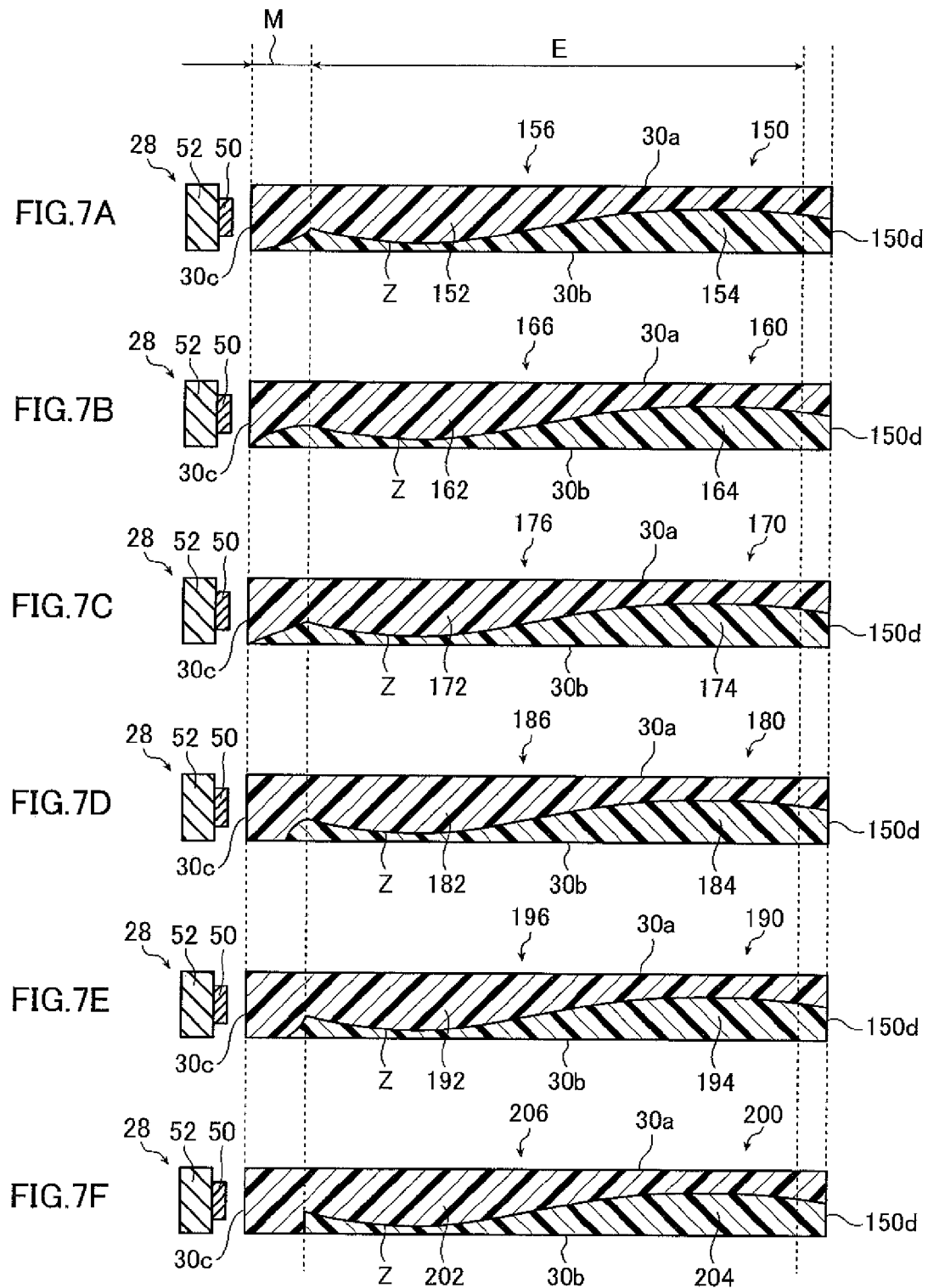
FIGS. 7A to 7F are schematic cross-sectional views showing other examples of the planar lighting device of the invention.

FIG. 7A is a schematic cross-sectional view showing part of a backlight unit using another example of the inventive light guide plate. Since the backlight unit 156 shown in FIG. 7A has the same configuration as the backlight unit 20 except that the light guide plate 30 is replaced by a light guide plate 150 and only one light source 28 is used, like elements are denoted by the same reference numerals and the following description mainly focuses on the distinctive portions.

The backlight unit 156 shown in FIG. 7A comprises the light guide plate 150 and the light source 28 disposed so as to face the first light incidence surface 30c of the light guide plate 150.

The light guide plate 150 includes the first light incidence surface 30c facing the disposed light source 28 and a lateral surface 150d opposite from the first light incidence surface 30c.

The light guide plate 150 includes a first layer 152 on the side closer to the light exit surface 30a and a second layer 154 on the side closer to the rear surface 30b. When seen from the cross section perpendicular to the longitudinal direction of the first light incidence surface 30c, the interface z between the first layer 152 and the second layer 154 changes so that the second layer 154 increases in thickness from the first light incidence surface 30c toward the lateral surface 150d, then once changes so that the second layer 154 decreases in thickness, then changes again so that the second layer 154 increases in thickness and continuously changes so that the second layer 154 decreases in thickness on the side closer to the lateral surface 150d.

More specifically, the interface z includes a curved surface convex toward the light exit surface 30a on the side closer to the lateral surface 150d, a concave curved surface smoothly connected to the convex curved surface, and a concave curved surface connected to the concave curved surface and communicating with one end of the light incidence surface 30c on the side closer to the rear surface 30b. The thickness of the second layer 154 at the light incidence surface 30c is zero.

More specifically, the combined particle concentration of the scattering particles (thickness of the second layer) is changed so as to have the first local maximum value in the vicinity of the first light incidence surface 30c and the second local maximum value on the side closer to the lateral surface 150d beyond the central portion of the light guide plate, the second local maximum value being larger than the first local maximum value.

Although not shown, the combined particle concentration of the light guide plate 150 has the first local maximum value at the edge of the opening of the housing. In other words, the region from the light incidence surface 30c to the position of the first local maximum value is a so-called mixing zone M for diffusing light having entered through the light incidence surface.

In the case of one-side light incidence using only one light source, by thus adjusting the combined particle concentration of the light guide plate 150 (thickness of the second layer 154) so that the concentration has the first local maximum value at a position closer to the light incidence surface 30c and the second local maximum value which is larger than the first local maximum value on the side closer to the lateral surface 150d beyond the central portion, light having entered through the light incidence surface can travel to a position farther from the light incidence surface even in a large and thin light guide plate, whereby outgoing light may have a luminance distribution which is high in the middle.

By adjusting the combined particle concentration so as to have the first local maximum value in the vicinity of the light incidence surface, light having entered through the light incidence surface can be sufficiently diffused in the vicinity of the light incidence surface to prevent outgoing light through the vicinity of the light incidence surface from having visible bright lines (dark lines, unevenness) which are attributable to such causes as intervals at which the light sources are disposed.

By adjusting the combined particle concentration such that the region on the side close to the light incidence surface from the position where the combined particle concentration takes the first local maximum value has a lower combined particle concentration than the first local maximum value, return light, which is light outgoing through the light incidence surface after it once enters the light guide plate, and outgoing light through the region in the vicinity of the light incidence surface (mixing zone M) which is not used because the region is covered with the housing can be reduced to improve the use efficiency of outgoing light through the effective region of the light exit surface (effective screen area E).

The interface z in the mixing zone M of the light guide plate 150 of the backlight unit 156 shown in FIG. 7A has such a shape as to include a curved surface which is concave toward the light exit surface 30a and communicates with an end of the light incidence surface 30c on the side closer to the rear surface 30b. However, the invention is not limited thereto.

FIGS. 7B to 7F are schematic views showing other examples of the light guide plate of the invention.

Each of backlight units 166, 176, 186, 196 and 206 shown in FIGS. 7B to 7F has the same configuration as the backlight unit 156 shown in FIG. 7A except that the thicknesses of the first layer 152 and the second layer 154 in the mixing zone M of the light guide plate 150, that is, the shape of the interface z in the portion from the light incidence surface 30c to the position of the first local maximum value is changed. Therefore, like elements are denoted by the same reference numerals and the following description mainly focuses on the distinctive portions.

A light guide plate 160 of the backlight unit 166 shown in FIG. 7B includes a first layer 162 and a second layer 164 having a higher particle concentration than the first layer 162. In the mixing zone M, the interface z between the first layer 162 and the second layer 164 has such a shape as to include a curved surface which communicates with the position of the first local maximum value, is convex toward the light exit surface 30a, and communicates with an end of the light incidence surface 30c on the side closer to the rear surface 30b.

A light guide plate 170 of the backlight unit 176 shown in FIG. 7C includes a first layer 172 and a second layer 174 having a higher particle concentration than the first layer 172. In the mixing zone M, the interface z between the first layer 172 and the second layer 174 includes a flat surface connecting the position of the first local maximum value to one end of the light incidence surface 30c on the side closer to the rear surface 30b.

A light guide plate 180 of the backlight unit 186 shown in FIG. 7D includes a first layer 182 and a second layer 184 having a higher particle concentration than the first layer 182. In the mixing zone M, the interface z between the first layer 182 and the second layer 184 has such a shape as to include a curved surface which communicates with the position of the first local maximum value, is convex toward the light exit surface 30a, and communicates with the rear surface 30b substantially in the middle of the mixing zone M.

A light guide plate 190 of the backlight unit 196 shown in FIG. 7E includes a first layer 192 and a second layer 194 having a higher particle concentration than the first layer 192. In the mixing zone M, the interface z between the first layer 192 and the second layer 194 has such a shape as to include a curved surface which communicates with the position of the first local maximum value, is concave toward the light exit surface 30a, and communicates with the rear surface 30b substantially in the middle of the mixing zone M.

A light guide plate 200 of the backlight unit 206 shown in FIG. 7F includes a first layer 202 and a second layer 204 having a higher particle concentration than the first layer 202. In the mixing zone M, the light guide plate 200 only includes the first layer 202. In other words, the interface z has such a shape as to include a flat surface passing through the position of the first local maximum value and parallel to the light incidence surface 30c.

By forming the interface z so as to have such a shape that the second layer decreases in thickness from the position of the first local maximum value toward the light incidence surface 30c as in the light guide plates shown in FIGS. 7B to 7F, the region from the position of the first local maximum value to the light incidence surface 30c (mixing zone M) can be adjusted to have a lower combined particle concentration than the first local maximum value to reduce return light, which is light outgoing through the light incidence surface after it once enters the light guide plate, and outgoing light through the region in the vicinity of the light incidence surface (mixing zone M) which is not used because the region is covered with the housing, whereupon the use efficiency of outgoing light through the effective region of the light exit surface (effective screen area E) can be improved.

The interface z in the effective screen area E of the light guide plate 150 shown in FIG. 7A has such a shape that the second layer 154 once decreases in thickness from the position of the first local maximum value toward the lateral surface 150d, then increases in thickness to take the second local maximum value, and decreases again in thickness. However, the invention is not limited thereto.

Figure 8:
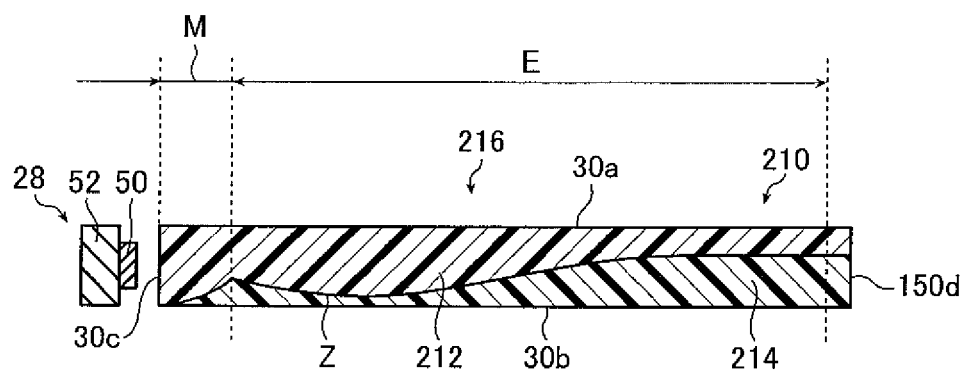
FIG. 8 is a schematic cross-sectional view showing another example of the planar lighting device of the invention.

FIG. 8 is a schematic view showing another example of the light guide plate of the invention.

A backlight unit 216 shown in FIG. 8 has the same configuration as the backlight unit 156 shown in FIG. 7A except that the thicknesses of the first layer 152 and the second layer 154 in the effective screen area E of the light guide plate 150, that is, the shape of the interface z in the portion from the position of the first local maximum value to the vicinity of the lateral surface 150d is changed. Therefore, like elements are denoted by the same reference numerals and the following description mainly focuses on the distinctive portions.

A light guide plate 210 of the backlight unit 216 shown in FIG. 8 includes a first layer 212 and a second layer 214 having a higher particle concentration than the first layer 212. In the mixing zone M, the interface z between the first layer 212 and the second layer 214 has such a shape that the second layer 214 once decreases in thickness from the position of the first local maximum value toward the lateral surface 150d, then increases in thickness to take the second local maximum value, and remains unchanged in thickness until the lateral surface 150d is reached.

Curved surfaces and flat surfaces are thus combined to form the interface z into an asymmetric shape so that the combined particle concentration of the scattering particles in the effective screen area E has a minimum value at a position close to the light incidence surface and a maximum value at a position far from the light incidence surface, whereby light emitted from the light source and allowed to enter through the light incidence surface can be guided deep into the light guide plate to obtain a suitable luminance distribution and improve the light use efficiency.

In the light guide plate shown in FIG. 7A where light is allowed to enter from one side, the rear surface is flat and parallel to the direction of light travel (light exit surface). However, this is not the sole case of the invention and the rear surface may be flat and inclined with respect to the direction of light travel.

Figure 9:
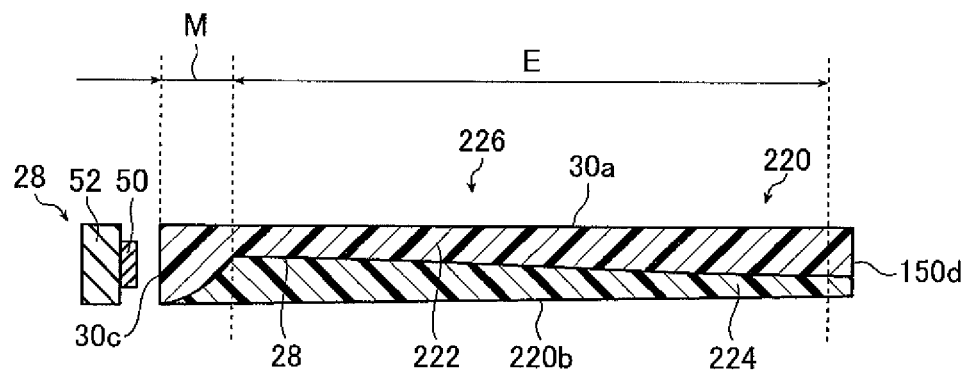
FIG. 9 is a schematic cross-sectional view showing still another example of the planar lighting device of the invention.

FIG. 9 is a schematic view showing still another example of the light guide plate of the invention.

A backlight unit 226 shown in FIG. 9 has the same configuration as the backlight unit 156 shown in FIG. 7A except that the rear surface 30b of the light guide plate 150 is inclined with respect to the light exit surface 30a, the thicknesses of the first layer 152 and the second layer 154 in the effective screen area E of the light guide plate 150, that is, the shape of the interface z in the portion from the position of the first local maximum value to the vicinity of the lateral surface 150d is changed. Therefore, like elements are denoted by the same reference numerals and the following description mainly focuses on the distinctive portions.

The backlight unit 226 shown in FIG. 9 comprises a light guide plate 220 and the light source 28 disposed so as to face the first light incidence surface 30c of the light guide plate 220.

In the light guide plate 220, a rear surface 220b is inclined with respect to the light exit surface 30a so that the thickness in a direction perpendicular to the light exit surface 30a decreases with increasing distance from the light incidence surface 30c.

The light guide plate 220 includes a first layer 222 and a second layer 224 having a higher particle concentration than the first layer 222. When seen from the cross section perpendicular to the longitudinal direction of the first light incidence surface 30c, the interface z between the first layer 222 and the second layer 224 once changes so that the second layer 224 increases in thickness toward the lateral surface 150d, and subsequently continuously changes so that the second layer 224 decreases in thickness.

By thus inclining the rear surface 220b in a direction in which the thickness of the light guide plate decreases with increasing distance from the light incidence surface 30c, the amount of outgoing light from the position away from the light incidence surface 30c can be increased. Therefore, by adjusting the shape of the interface z and the combined particle concentration in accordance therewith, incident light through the light incidence surface can be guided deep into the light guide plate to obtain a suitable luminance distribution and improve the light use efficiency.

The backlight unit using the light guide plate of the invention is not limited thereto and, in addition to the two light sources, light sources may also be provided so as to face the lateral surfaces on the short sides of the light exit surface of the light guide plate. The intensity of light emitted from the device can be enhanced by increasing the number of light sources.

Light may be emitted not only through the light exit surface but also from the rear surface side.

The light guide plate of the invention includes two layers which contain scattering particles at different particle concentrations. However, the light guide plate is not limited thereto and may include three or more layers which are different in the scattering particle concentration.

EXAMPLES

The invention will be described below in greater detail with reference to specific examples of the invention.

Example 1

In Example 1, the illuminance distribution and luminance distribution of outgoing light through the light exit surface were determined by computer simulation using a light guide plate having the interface z as shown in FIG. 3B.

In the simulation, the material of the transparent resin of the light guide plate and the material of the scattering particles were modeled as PMMA and silicone. This will also apply to the examples given below.

In Example 1, the light guide plate 30 corresponding to a 40-inch screen size was used. More specifically, the following light guide plate was used: the length from the first light incidence surface 30c to the second light incidence surface 30d was 539 mm; the thickness of the light guide plate 30 was 1.5 mm; the thickness of the second layer 62 at the bisector α, that is, the thickness of the second layer 62 at the position of the second local maximum value was 0.75 mm; the thickness of the second layer 62 at the positions of the first local maximum value was 0.3 mm; the thickness of the second layer 62 at the thinnest positions between the positions of the first local maximum value and the position of the second local maximum value was 0.25 mm; and the distance from the positions of the first local maximum value to their corresponding light incidence surfaces was 20 mm. The particle size of the scattering particles to be kneaded and dispersed in the light guide plate was set to 4.5 μm, the particle concentration Npo of the first layer 60 was set to 0.02 wt %, and the particle concentration Npr of the second layer 62 was set to 0.2 wt %.

The light guide plate having the shape as described above was used to measure the illuminance distribution and the luminance distribution. In this process, the illuminance distribution and the luminance distribution in the case where light was allowed to enter through only one light incidence surface were also measured in order to understand the effects of the invention.

Figure 10A:
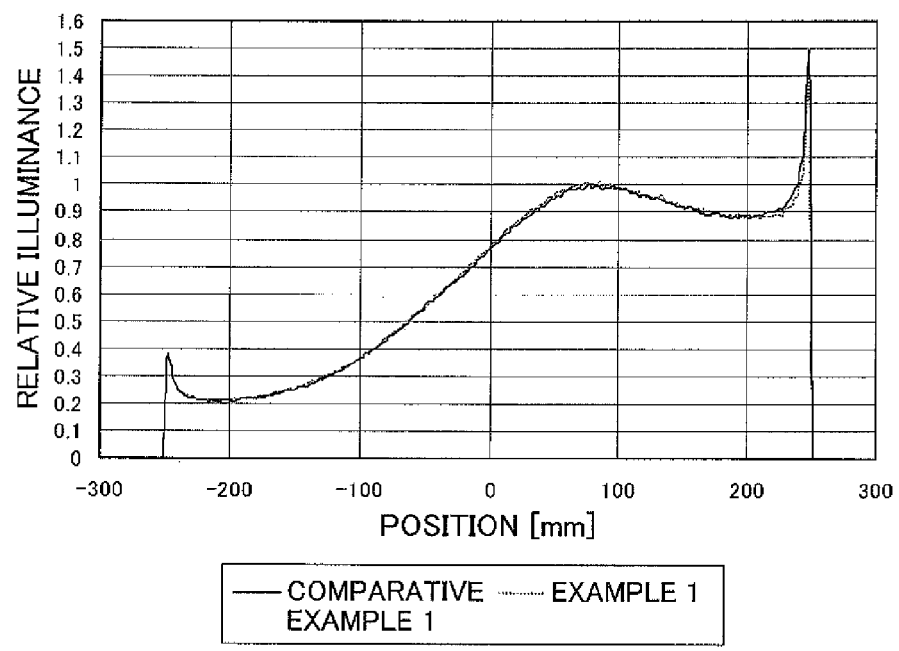
FIG. 10A is a graph showing the measurement results of the illuminance distribution of light emitted through the light exit surface of the light guide plate.
Figure 10B:
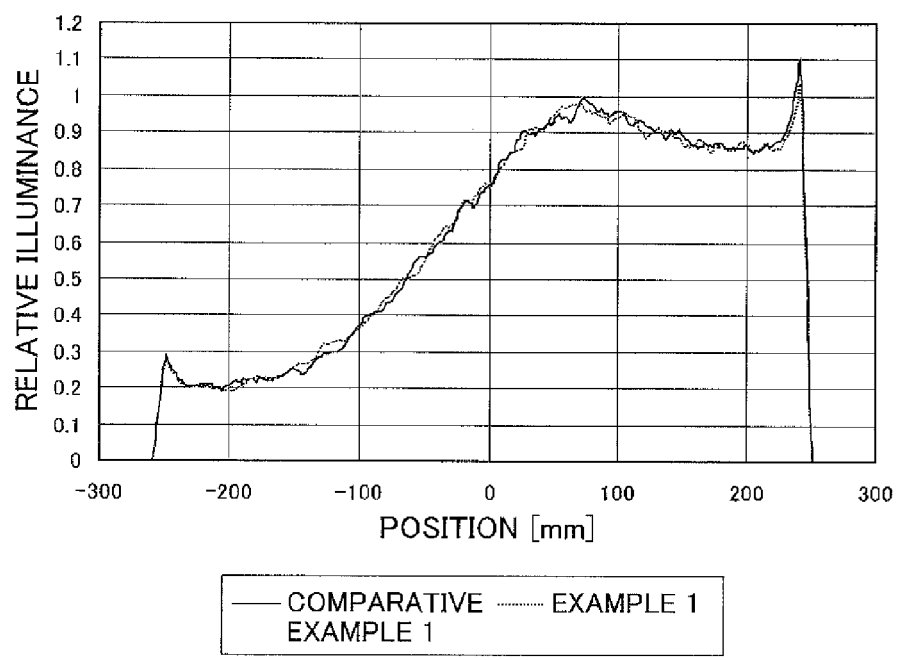
FIG. 10B is a graph showing the measurement results of the luminance distribution of light emitted through the light exit surface of the light guide plate.
Figure 11A:
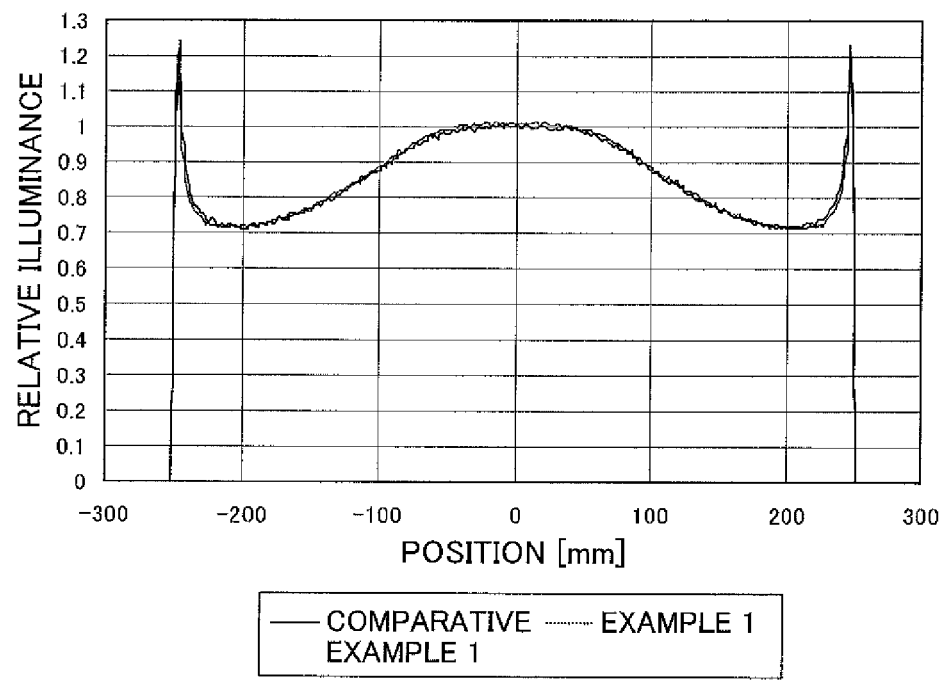
FIG. 11A is a graph showing the measurement results of the illuminance distribution of light emitted through the light exit surface of the light guide plate.
Figure 11B:
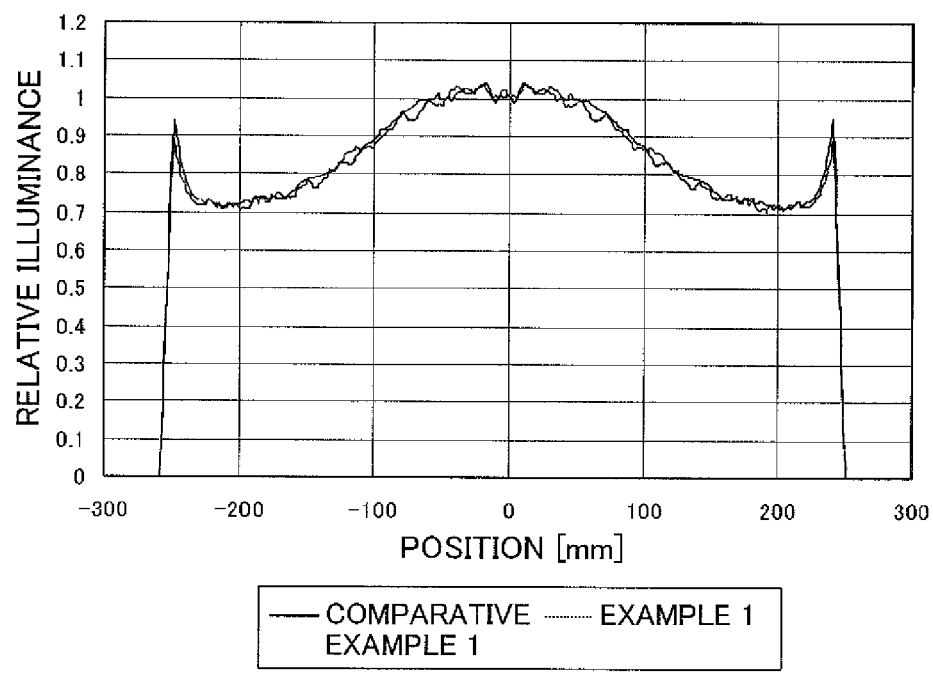
FIG. 11B is a graph showing the measurement results of the luminance distribution of light emitted through the light exit surface of the light guide plate.

The measured illuminance distribution and luminance distribution are shown in FIGS. 10A and 10B (light incidence from one side) and FIGS. 11A and 11B (light incidence from both sides). In FIGS. 10A and 11A, the vertical axis indicates the relative illuminance, and the horizontal axis indicates the distance [mm] from the center of the light guide plate. In FIGS. 10B and 11B, the vertical axis indicates the relative luminance, and the horizontal axis indicates the distance [mm] from the center of the light guide plate. Example 1 is indicated by a broken line and Comparative Example 1 by a solid line.

Figure 25:
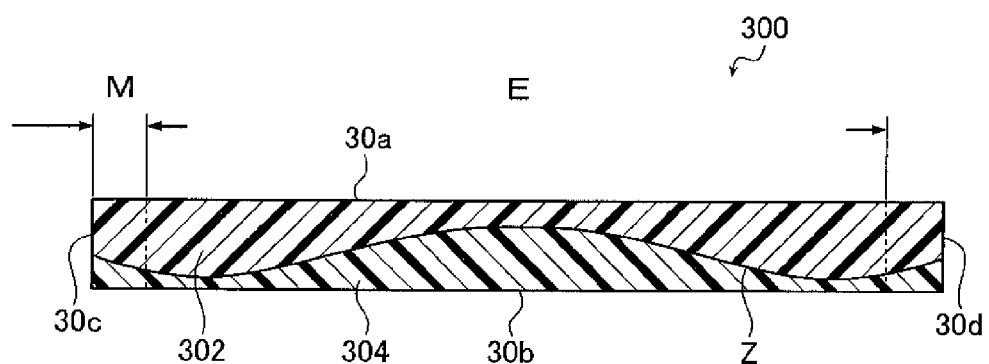
FIG. 25 is a schematic cross-sectional view showing an example of the light guide plate.

In Comparative Example 1, a light guide plate 300 having the shape shown in FIG. 25 was used. In the light guide plate 300 shown in FIG. 25, the interface z between a first layer 302 and a second layer 304 having a higher particle concentration than the first layer 302 continuously changes so that the second layer 304 decreases in thickness from the center of the light guide plate 300 toward the light incidence surfaces 30c and 30d and continuously changes so that the second layer 304 increases in thickness in the vicinities of the light incidence surfaces 30c and 30d.

As shown in FIGS. 10A, 10B, 11A and 11B, compared to the light guide plate 300 having the shape shown in FIG. 25, the light guide plate 30 in Example 1 decreases in illuminance and luminance in close proximity to the light incidence surfaces, that is, at the positions corresponding to the mixing zones M and increases in illuminance and luminance in the central region of the light guide plate, that is, at the position corresponding to the effective screen area E.

The illuminance and luminance in the effective screen area E can be thus increased to improve the light use efficiency.

Example 2

In Example 2, the illuminance distribution and luminance distribution of outgoing light through the light exit surface were determined by computer simulation using a light guide plate having the interface z as shown in FIG. 6D.

The light guide plate used in Example 2 was the light guide plate 130 corresponding to a 40-inch screen size. More specifically, the following light guide plate was used: the length from the first light incidence surface 30c to the second light incidence surface 30d was 539 mm; the thickness of the light guide plate 130 was 1.5 mm; the thickness of the second layer 134 at the bisector α, that is, the thickness of the second layer 134 at the position of the second local maximum value was 0.75 mm; the thickness of the second layer 134 at the positions of the first local maximum value was 0.25 mm; the thickness of the second layer 134 at the thinnest positions between the positions of the first local maximum value and the position of the second local maximum value was 0.2 mm; and the distance from the positions of the first local maximum value to their corresponding light incidence surfaces was 20 mm. The particle size of the scattering particles to be kneaded and dispersed in the light guide plate was set to 4.5 μm, the particle concentration Npo of the first layer 132 was set to 0.02 wt %, and the particle concentration Npr of the second layer 134 was set to 0.2 wt %.

The light guide plate having the shape as described above was used to measure the illuminance distribution and the luminance distribution. In this process, the illuminance distribution and the luminance distribution in the case where light was allowed to enter through only one light incidence surface were also measured in order to understand the effects of the invention.

Figure 12A:
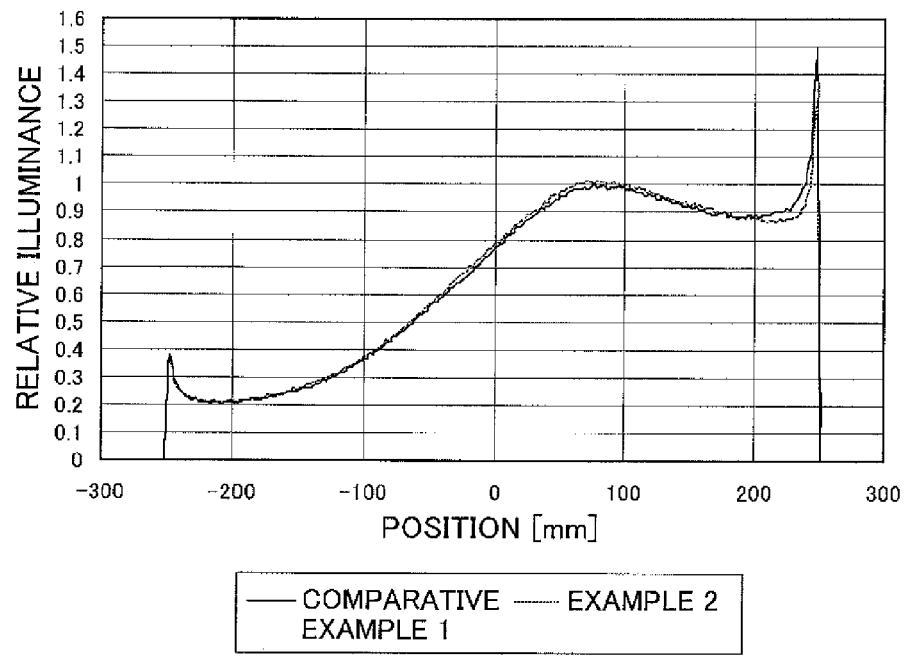
FIG. 12A is a graph showing the measurement results of the illuminance distribution of light emitted through the light exit surface of the light guide plate.
Figure 12B:
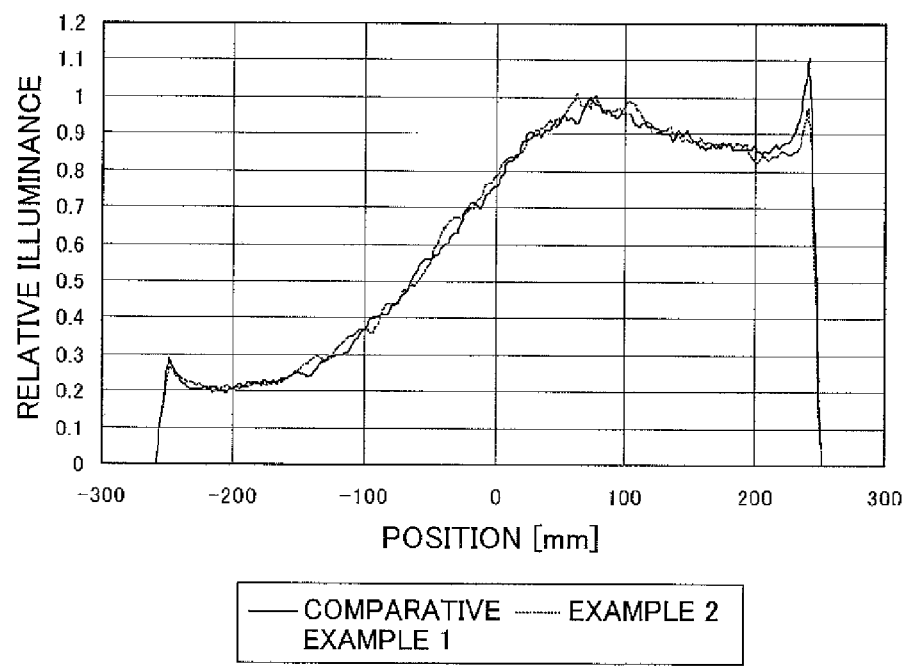
FIG. 12B is a graph showing the measurement results of the luminance distribution of light emitted through the light exit surface of the light guide plate.
Figure 13A:
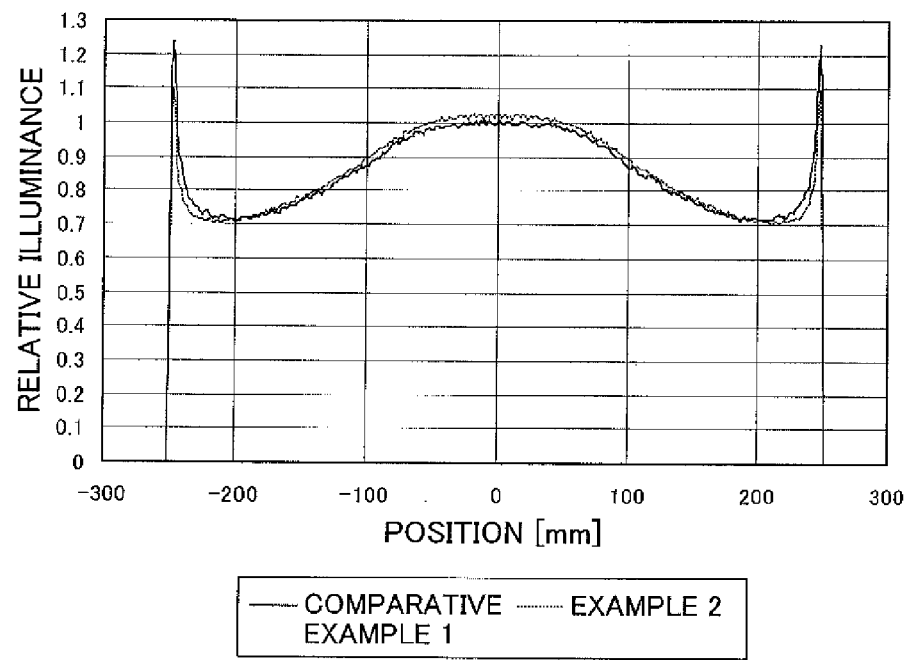
FIG. 13A is a graph showing the measurement results of the illuminance distribution of light emitted through the light exit surface of the light guide plate.
Figure 13B:
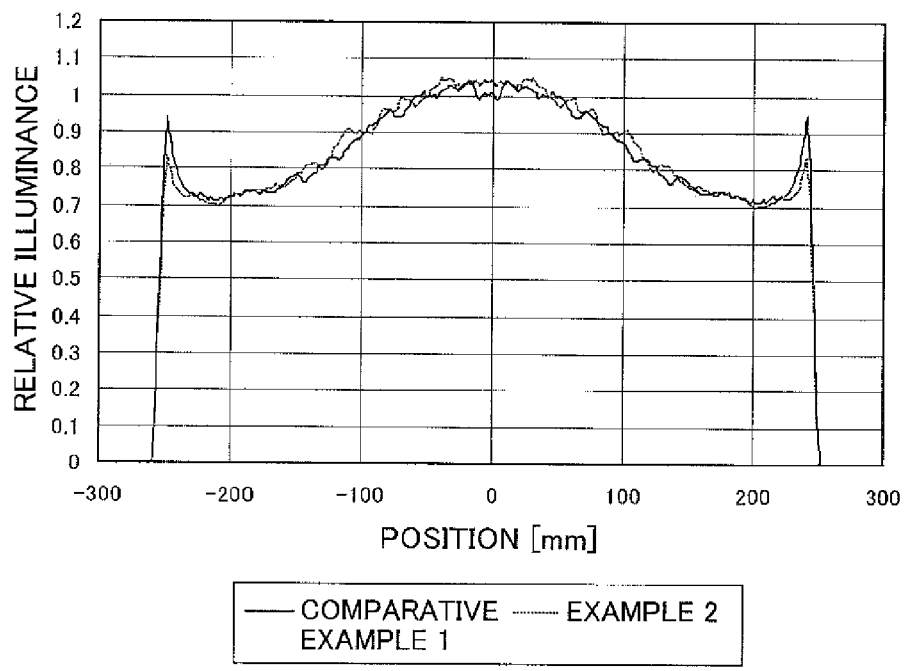
FIG. 13B is a graph showing the measurement results of the luminance distribution of light emitted through the light exit surface of the light guide plate.

The measured illuminance distribution and luminance distribution are shown in FIGS. 12A and 12B (light incidence from one side) and FIGS. 13A and 13B (light incidence from both sides). In FIGS. 12A and 13A, the vertical axis indicates the relative illuminance, and the horizontal axis indicates the distance [mm] from the center of the light guide plate. In FIGS. 12B and 13B, the vertical axis indicates the relative luminance, and the horizontal axis indicates the distance [mm] from the center of the light guide plate. Example 2 is indicated by a broken line and Comparative Example 1 by a solid line.

As shown in FIGS. 12A, 12B, 13A and 13B, compared to the light guide plate 300 having the shape shown in FIG. 25, the light guide plate 130 in Example 2 decreases in illuminance and luminance in close proximity to the light incidence surfaces, that is, at the positions corresponding to the mixing zones M and increases in illuminance and luminance in the central region of the light guide plate, that is, at the position corresponding to the effective screen area E.

The illuminance and luminance in the effective screen area E can be thus increased to improve the light use efficiency.

Next, the illuminance distributions of outgoing light from the backlight units in which the shape of the interface z between the first layer and the second layer was variously changed were determined.

Example 3

In Example 3, light guide plates corresponding to a 32-inch screen size were used to determine the illuminance distributions of outgoing light from the backlight units in which the shape of the interface z between the first layer and the second layer was variously changed.

More specifically, use were made of the light guide plates 140 corresponding to the 32-inch screen size which included the interface z as shown in FIG. 6E and in which the length from the first light incidence surface 30c to the second light incidence surface 30d was 413 mm.

In Example 3-1a, the following light guide plate was used: the thickness of the light guide plate 140 was 3.0 mm; the thickness of the second layer 144 at the bisector α, that is, the thickness of the second layer 144 at the position of the second local maximum value was 1.0 mm; the thickness of the second layer 144 at the positions of the first local maximum value was 0.5 mm; and the thickness of the second layer 144 at the thinnest positions between the positions of the first local maximum value and the position of the second local maximum value (thinnest portions) was 0.49 mm. The scattering particles to be kneaded and dispersed in the light guide plate had a particle size of 4.5 μm.

The light-emitting face 58 of each LED chip 50 had the following dimensions: the height a was 2.2 mm; and the width b was 3.0 mm.

The distance from the light incidence surfaces to their corresponding positions of the first local maximum value was set to 10 mm; the distance from the position of the second local maximum value (central portion) to the thinnest portions to 182 mm; and the distance from the position of the second local maximum value to the inflection points on the interface z located between the position of the second local maximum value and the thinnest portions to 14 mm. The particle concentration Npo of the first layer 142 was set to 0.003 wt % and the particle concentration Npr of the second layer 144 to 0.275 wt %.

In other words, the combined particle concentration had a first local maximum value of 0.048 wt %, a second local maximum value of 0.094 wt % and a concentration in the thinnest portions of 0.047 wt %.

Example 3-1b used the same light guide plate as that in Example 3-1a except that the particle concentration Npr of the second layer 144 in Example 3-1a was changed to 0.325 wt %. In other words, the combined particle concentration had a first local maximum value of 0.057 wt %, a second local maximum value of 0.110 wt % and a concentration in the thinnest portions of 0.056 wt %.

Example 3-1c used the same light guide plate as that in Example 3-1a except that the particle concentration Npr of the second layer 144 in Example 3-1a was changed to 0.375 wt %. In other words, the combined particle concentration had a first local maximum value of 0.065 wt %, a second local maximum value of 0.127 wt % and a concentration in the thinnest portions of 0.064 wt %.

Example 3-1d used the same light guide plate as that in Example 3-1a except that the distance from the position of the second local maximum value (central portion) to the thinnest portions was changed to 189 mm and the distance from the position of the second local maximum value to the inflection points on the interface z located between the position of the second local maximum value and the thinnest portions was changed to 101 mm.

Example 3-1e used the same light guide plate as that in Example 3-1d except that the particle concentration Npr of the second layer 144 in Example 3-1d was changed to 0.325 wt %. Example 3-1f used the same light guide plate as that in Example 3-1d except that the particle concentration Npr of the second layer 144 in Example 3-1d was changed to 0.375 wt %.

Example 3-1g used the same light guide plate as that in Example 3-1a except that the distance from the position of the second local maximum value (central portion) to the thinnest portions was changed to 197 mm and the distance from the position of the second local maximum value to the inflection points on the interface z located between the position of the second local maximum value and the thinnest portions was changed to 184 mm.

Example 3-1h used the same light guide plate as that in Example 3-1g except that the particle concentration Npr of the second layer 144 in Example 3-1g was changed to 0.325 wt %.

Example 3-1i used the same light guide plate as that in Example 3-1g except that the particle concentration Npr of the second layer 144 in Example 3-1g was changed to 0.375 wt %.

In Example 3-2a, the following light guide plate was used: the thickness of the light guide plate 140 was 1.5 mm; the thickness of the second layer 144 at the bisector α, that is, the thickness of the second layer 144 at the position of the second local maximum value was 0.5 mm; the thickness of the second layer 144 at the positions of the first local maximum value was 0.25 mm; and the thickness of the second layer 144 at the thinnest positions between the positions of the first local maximum value and the position of the second local maximum value (thinnest portions) was 0.24 mm. The scattering particles to be kneaded and dispersed in the light guide plate had a particle size of 4.5 μm.

The light-emitting face 58 of each LED chip 50 had the following dimensions: the height a was 1.1 mm; and the width b was 2.2 mm.

The following light guide plate was used: the distance from the light incidence surfaces to their corresponding positions of the first local maximum value was 10 mm; the distance from the position of the second local maximum value (central portion) to the thinnest portions was 197 mm; and the distance from the position of the second local maximum value to the inflection points on the interface z located between the position of the second local maximum value and the thinnest portions was 6 mm. The particle concentration Npo of the first layer 142 was set to 0.003 wt % and the particle concentration Npr of the second layer 144 to 0.275 wt %.

In other words, the combined particle concentration had a first local maximum value of 0.048 wt %, a second local maximum value of 0.094 wt % and a concentration in the thinnest portions of 0.047 wt %.

Example 3-2b used the same light guide plate as that in Example 3-2a except that the particle concentration Npr of the second layer 144 in Example 3-2a was changed to 0.325 wt %. In other words, the combined particle concentration had a first local maximum value of 0.057 wt %, a second local maximum value of 0.0110 wt % and a concentration in the thinnest portions of 0.055 wt %.

Example 3-2c used the same light guide plate as that in Example 3-2a except that the particle concentration Npr of the second layer 144 in Example 3-2a was changed to 0.225 wt %. In other words, the combined particle concentration had a first local maximum value of 0.040 wt %, a second local maximum value of 0.077 wt % and a concentration in the thinnest portions of 0.039 wt %.

Example 3-2d used the same light guide plate as that in Example 3-2a except that the distance from the position of the second local maximum value to the inflection points on the interface z located between the position of the second local maximum value and the thinnest portions was changed to 103 mm and the particle concentration Npr of the second layer 144 was changed to 0.325 wt %.

Example 3-2e used the same light guide plate as that in Example 3-2d except that the particle concentration Npr of the second layer 144 in Example 3-2d was changed to 0.375 wt %.

Example 3-2f used the same light guide plate as that in Example 3-2d except that the particle concentration Npr of the second layer 144 in Example 3-2d was changed to 0.275 wt %.

Example 3-2g used the same light guide plate as that in Example 3-2a except that the distance from the position of the second local maximum value to the inflection points on the interface z located between the position of the second local maximum value and the thinnest portions was changed to 197 mm.

Example 3-2h used the same light guide plate as that in Example 3-2g except that the particle concentration Npr of the second layer 144 in Example 3-2g was changed to 0.325 wt %.

Example 3-2i used the same light guide plate as that in Example 3-2g except that the particle concentration Npr of the second layer 144 in Example 3-2g was changed to 0.225 wt %.

In Example 3-3a, the following light guide plate was used: the thickness of the light guide plate 140 was 1.0 mm; the thickness of the second layer 144 at the bisector α, that is, the thickness of the second layer 144 at the position of the second local maximum value was 0.34 mm; the thickness of the second layer 144 at the positions of the first local maximum value was 0.17 mm; and the thickness of the second layer 144 at the thinnest positions between the positions of the first local maximum value and the position of the second local maximum value (thinnest portions) was 0.168 mm. The scattering particles to be kneaded and dispersed in the light guide plate had a particle size of 4.5 μm.

The light-emitting face 58 of each LED chip 50 had the following dimensions: the height a was 0.73 mm; and the width b was 1.45 mm.

The following light guide plate was used: the distance from the light incidence surfaces to their corresponding positions of the first local maximum value was 10 mm; the distance from the position of the second local maximum value (central portion) to the thinnest portions was 190 mm; and the distance from the position of the second local maximum value to the inflection points on the interface z located between the position of the second local maximum value and the thinnest portions was 4 mm. The particle concentration Npo of the first layer 142 was set to 0.003 wt % and the particle concentration Npr of the second layer 144 to 0.325 wt %.

In other words, the combined particle concentration had a first local maximum value of 0.058 wt %, a second local maximum value of 0.129 wt % and a concentration in the thinnest portions of 0.057 wt %.

Example 3-3b used the same light guide plate as that in Example 3-3a except that the particle concentration Npr of the second layer 144 in Example 3-3a was changed to 0.375 wt %. In other words, the combined particle concentration had a first local maximum value of 0.066 wt %, a second local maximum value of 0.112 wt % and a concentration in the thinnest portions of 0.065 wt %.

Example 3-3c used the same light guide plate as that in Example 3-3a except that the particle concentration Npr of the second layer 144 in Example 3-3a was changed to 0.275 wt %. In other words, the combined particle concentration had a first local maximum value of 0.049 wt %, a second local maximum value of 0.095 wt % and a concentration in the thinnest portions of 0.049 wt %.

Example 3-3d used the same light guide plate as that in Example 3-3a except that the distance from the position of the second local maximum value (central portion) to the thinnest portions was changed to 195 mm and the distance from the position of the second local maximum value to the inflection points on the interface z located between the position of the second local maximum value and the thinnest portions was changed to 101 mm.

Example 3-3e used the same light guide plate as that in Example 3-3d except that the particle concentration Npr of the second layer 144 in Example 3-3d was changed to 0.375 wt %.

Example 3-3f used the same light guide plate as that in Example 3-3d except that the particle concentration Npr of the second layer 144 in Example 3-3d was changed to 0.275 wt %.

Example 3-3g used the same light guide plate as that in Example 3-3a except that the distance from the position of the second local maximum value (central portion) to the thinnest portions was changed to 197 mm and the distance from the position of the second local maximum value to the inflection points on the interface z located between the position of the second local maximum value and the thinnest portions was changed to 197 mm.

Example 3-3h used the same light guide plate as that in Example 3-3g except that the particle concentration Npr of the second layer 144 in Example 3-3g was changed to 0.375 wt %.

Example 3-3i used the same light guide plate as that in Example 3-3g except that the particle concentration Npr of the second layer 144 in Example 3-3g was changed to 0.275 wt %.

The light guide plates having the shapes as described above were used to measure the illuminance distributions.

The measured illuminance distributions are shown in FIGS. 14A, 14B, 14C, 15A, 15B, 15C, 16A, 16B and 16C. In FIGS. 14A to 16C, the vertical axis indicates the relative illuminance, and the horizontal axis indicates the distance [mm] from the center of the light guide plate.

Figure 14A:
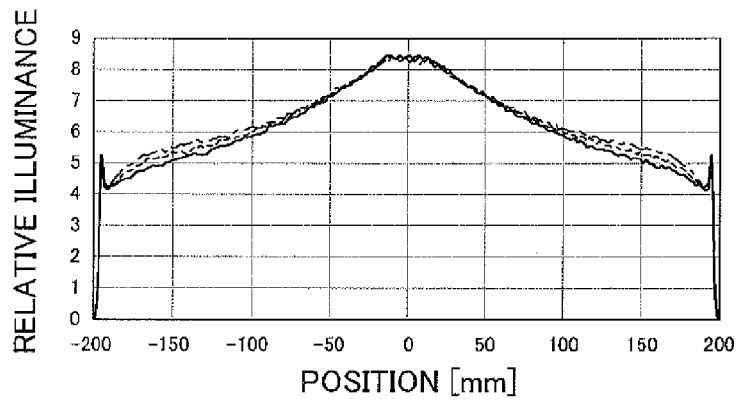
FIGS. 14A, 14B and 14C are graphs showing the measurement results of the illuminance distribution of light emitted through the light exit surface of the light guide plate.
Figure 14B:
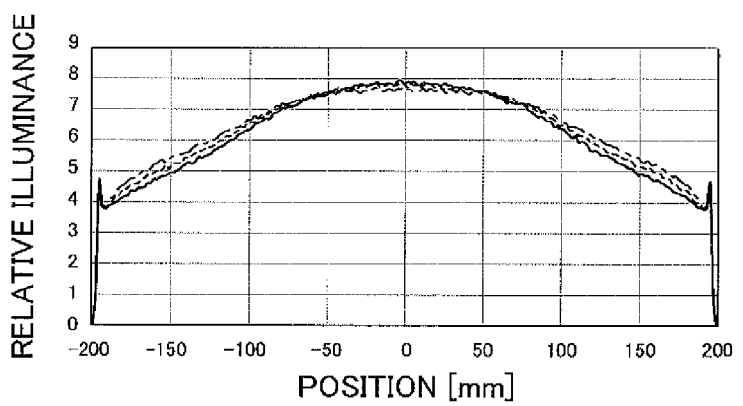
Figure 14C:
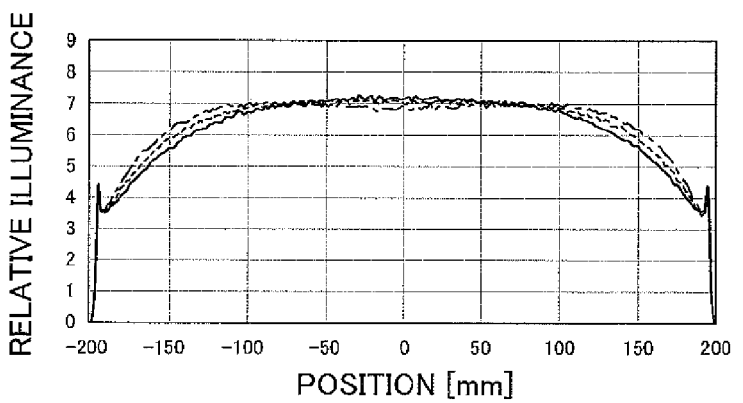

In FIG. 14A, Example 3-1a is indicated by a solid line, Example 3-1b by a broken line, and Example 3-1c by a chain line. In FIG. 14B, Example 3-1d is indicated by a solid line, Example 3-1e by a broken line, and Example 3-1f by a chain line. In FIG. 14C, Example 3-1g is indicated by a solid line, Example 3-1h by a broken line, and Example 3-1i by a chain line.

Figure 15A:
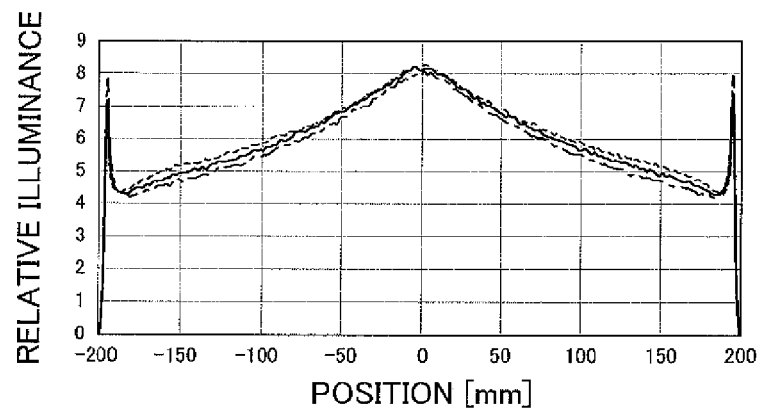
FIGS. 15A, 15B and 15C are graphs showing the measurement results of the illuminance distribution of light emitted through the light exit surface of the light guide plate.
Figure 15B:
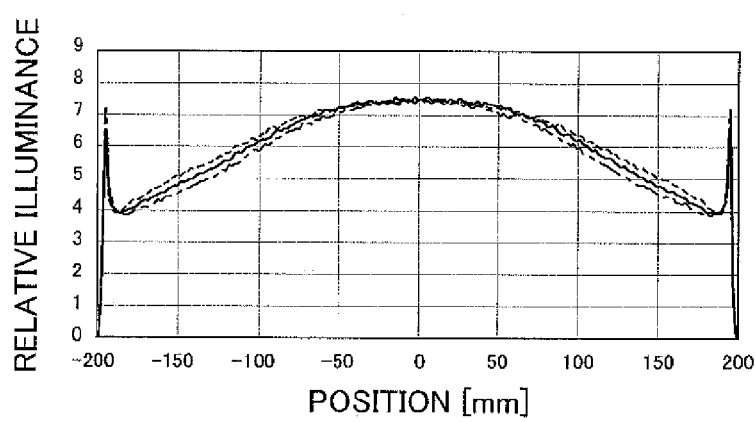
Figure 15C:
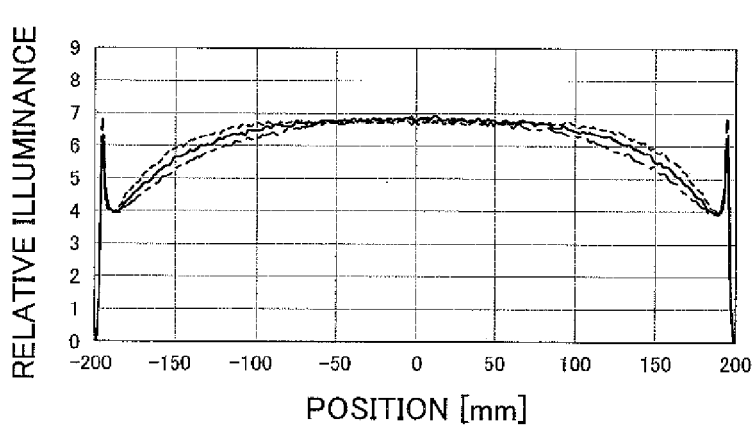

In FIG. 15A, Example 3-2a is indicated by a solid line, Example 3-2b by a broken line, and Example 3-2c by a chain line. In FIG. 15B, Example 3-2d is indicated by a solid line, Example 3-2e by a broken line, and Example 3-2f by a chain line. In FIG. 15C, Example 3-2g is indicated by a solid line, Example 3-2h by a broken line, and Example 3-2i by a chain line.

Figure 16A:
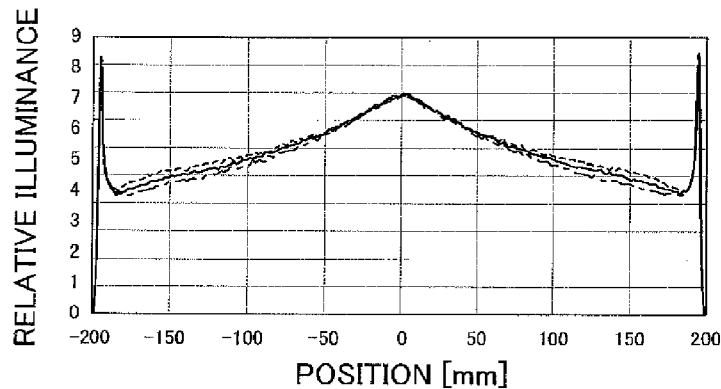
FIGS. 16A, 16B and 16C are graphs showing the measurement results of the illuminance distribution of light emitted through the light exit surface of the light guide plate.
Figure 16B:
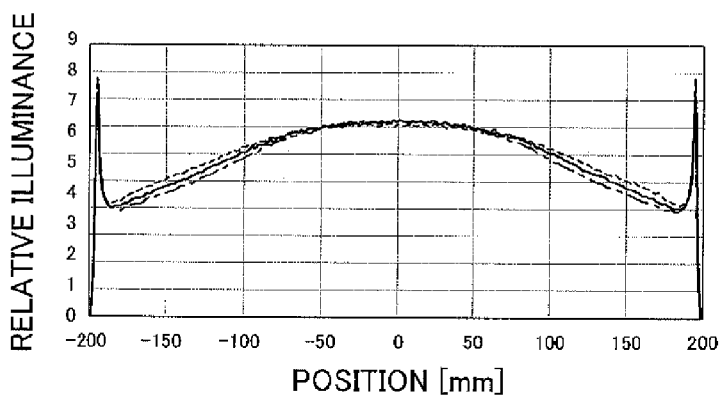
Figure 16C:
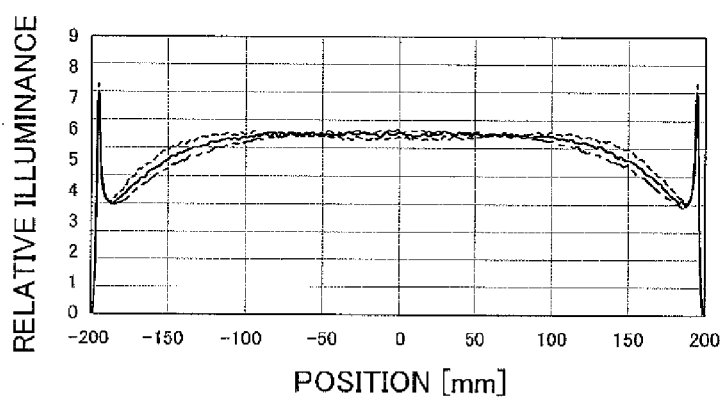

In FIG. 16A, Example 3-3a is indicated by a solid line, Example 3-3b by a broken line, and Example 3-3c by a chain line. In FIG. 16B, Example 3-3d is indicated by a solid line, Example 3-3e by a broken line, and Example 3-3f by a chain line. In FIG. 16C, Example 3-3g is indicated by a solid line, Example 3-3h by a broken line, and Example 3-3i by a chain line.

As shown in FIGS. 14A, 14B, 14C, 15A, 15B, 15C, 16A, 16B and 16C, the 32-inch light guide plates can provide uniform outgoing light illuminance distributions which are higher in the middle by changing the thicknesses of the first and second layers in the direction perpendicular to the light incidence surfaces so that the combined particle concentration may have the first local maximum value on the sides closer to the light incidence surfaces and the second local maximum value which is at the position farther from the light incidence surfaces than the positions of the first local maximum value and is larger than the first local maximum value, and adjusting the shape of the interface between the first layer and the second layer so that the distance from the central portion to the inflection points may be from 4 to 197 mm and the distance from the central portion to the thinnest portions of the second layer may be from 182 to 197 mm.

Example 4

Next, in Example 4, light guide plates corresponding to a 46-inch screen size were used to determine the illuminance distributions of outgoing light from the backlight units in which the shape of the interface z between the first layer and the second layer was variously changed.

More specifically, use were made of the light guide plates 140 corresponding to the 46-inch screen size which included the interface z as shown in FIG. 6E and in which the length from the first light incidence surface 30c to the second light incidence surface 30d was 593 mm.

In Example 4-1a, the following light guide plate was used: the thickness of the light guide plate 140 was 3.0 mm; the thickness of the second layer 144 at the bisector α, that is, the thickness of the second layer 144 at the position of the second local maximum value was 1.0 mm; the thickness of the second layer 144 at the positions of the first local maximum value was 0.5 mm; and the thickness of the second layer 144 at the thinnest positions between the positions of the first local maximum value and the position of the second local maximum value (thinnest portions) was 0.48 mm. The scattering particles to be kneaded and dispersed in the light guide plate had a particle size of 4.5 μm.

The light-emitting face 58 of each LED chip 50 had the following dimensions: the height a was 2.2 mm; and the width b was 3.0 mm.

The distance from the light incidence surfaces to their corresponding positions of the first local maximum value was set to 10 mm; the distance from the position of the second local maximum value (central portion) to the thinnest portions to 279 mm; and the distance from the position of the second local maximum value to the inflection points on the interface z located between the position of the second local maximum value and the thinnest portions to 9 mm. The particle concentration Npo of the first layer 142 was set to 0.003 wt % and the particle concentration Npr of the second layer 144 to 0.225 wt %.

In other words, the combined particle concentration had a first local maximum value of 0.040 wt %, a second local maximum value of 0.077 wt % and a concentration in the thinnest portions of 0.039 wt %.

Example 4-1b used the same light guide plate as that in Example 4-1a except that the particle concentration Npr of the second layer 144 in Example 4-1a was changed to 0.175 wt %. In other words, the combined particle concentration had a first local maximum value of 0.032 wt %, a second local maximum value of 0.060 wt % and a concentration in the thinnest portions of 0.031 wt %.

Example 4-1c used the same light guide plate as that in Example 4-1a except that the particle concentration Npr of the second layer 144 in Example 4-1a was changed to 0.275 wt %. In other words, the combined particle concentration had a first local maximum value of 0.048 wt %, a second local maximum value of 0.094 wt % and a concentration in the thinnest portions of 0.047 wt %.

Example 4-1d used the same light guide plate as that in Example 4-1a except that the distance from the position of the second local maximum value (central portion) to the thinnest portions was changed to 283 mm and the distance from the position of the second local maximum value to the inflection points on the interface z located between the position of the second local maximum value and the thinnest portions was changed to 146 mm.

Example 4-1e used the same light guide plate as that in Example 4-1d except that the particle concentration Npr of the second layer 144 in Example 4-1d was changed to 0.175 wt %.

Example 4-1f used the same light guide plate as that in Example 4-1d except that the particle concentration Npr of the second layer 144 in Example 4-1d was changed to 0.275 wt %.

Example 4-1g used the same light guide plate as that in Example 4-1a except that the distance from the position of the second local maximum value (central portion) to the thinnest portions was changed to 287 mm and the distance from the position of the second local maximum value to the inflection points on the interface z located between the position of the second local maximum value and the thinnest portions was changed to 281 mm.

Example 4-1h used the same light guide plate as that in Example 4-1g except that the particle concentration Npr of the second layer 144 in Example 4-1g was changed to 0.175 wt %.

Example 4-1i used the same light guide plate as that in Example 4-1g except that the particle concentration Npr of the second layer 144 in Example 4-1g was changed to 0.275 wt %.

In Example 4-2a, the following light guide plate was used: the thickness of the light guide plate 140 was 1.5 mm; the thickness of the second layer 144 at the bisector α, that is, the thickness of the second layer 144 at the position of the second local maximum value was 0.5 mm; the thickness of the second layer 144 at the positions of the first local maximum value was 0.25 mm; and the thickness of the second layer 144 at the thinnest positions between the positions of the first local maximum value and the position of the second local maximum value (thinnest portions) was 0.248 mm. The scattering particles to be kneaded and dispersed in the light guide plate had a particle size of 4.5 μm.

The light-emitting face 58 of each LED chip 50 had the following dimensions: the height a was 1.1 mm; and the width b was 2.2 mm.

The following light guide plate was used: the distance from the light incidence surfaces to their corresponding positions of the first local maximum value was 10 mm; the distance from the position of the second local maximum value (central portion) to the thinnest portions was 285 mm; and the distance from the position of the second local maximum value to the inflection points on the interface z located between the position of the second local maximum value and the thinnest portions was 4 mm. The particle concentration Npo of the first layer 142 was set to 0.003 wt % and the particle concentration Npr of the second layer 144 to 0.225 wt %.

In other words, the combined particle concentration had a first local maximum value of 0.040 wt %, a second local maximum value of 0.077 wt % and a concentration in the thinnest portions of 0.040 wt %.

Example 4-2b used the same light guide plate as that in Example 4-2a except that the particle concentration Npr of the second layer 144 in Example 4-2a was changed to 0.175 wt %. In other words, the combined particle concentration had a first local maximum value of 0.032 wt %, a second local maximum value of 0.060 wt % and a concentration in the thinnest portions of 0.031 wt %.

Example 4-2c used the same light guide plate as that in Example 4-2a except that the particle concentration Npr of the second layer 144 in Example 4-2a was changed to 0.275 wt %. In other words, the combined particle concentration had a first local maximum value of 0.041 wt %, a second local maximum value of 0.078 wt % and a concentration in the thinnest portions of 0.039 wt %.

Example 4-2d used the same light guide plate as that in Example 4-2a except that the distance from the position of the second local maximum value (central portion) to the thinnest portions was changed to 287 mm and the distance from the position of the second local maximum value to the inflection points on the interface z located between the position of the second local maximum value and the thinnest portions was changed to 149 mm.

Example 4-2e used the same light guide plate as that in Example 4-2d except that the particle concentration Npr of the second layer 144 in Example 4-2d was changed to 0.175 wt %.

Example 4-2f used the same light guide plate as that in Example 4-2d except that the particle concentration Npr of the second layer 144 in Example 4-2d was changed to 0.275 wt %.

Example 4-2g used the same light guide plate as that in Example 4-2a except that the distance from the position of the second local maximum value (central portion) to the thinnest portions was changed to 287 mm and the distance from the position of the second local maximum value to the inflection points on the interface z located between the position of the second local maximum value and the thinnest portions was changed to 287 mm.

Example 4-2h used the same light guide plate as that in Example 4-2g except that the particle concentration Npr of the second layer 144 in Example 4-2g was changed to 0.175 wt %.

Example 4-2i used the same light guide plate as that in Example 4-2g except that the particle concentration Npr of the second layer 144 in Example 4-2g was changed to 0.275 wt %.

In Example 4-3a, the following light guide plate was used: the thickness of the light guide plate 140 was 1.0 mm; the thickness of the second layer 144 at the bisector α, that is, the thickness of the second layer 144 at the position of the second local maximum value was 0.34 mm; the thickness of the second layer 144 at the positions of the first local maximum value was 0.17 mm; and the thickness of the second layer 144 at the thinnest positions between the positions of the first local maximum value and the position of the second local maximum value (thinnest portions) was 0.16 mm. The scattering particles to be kneaded and dispersed in the light guide plate had a particle size of 4.5 μm.

The light-emitting face 58 of each LED chip 50 had the following dimensions: the height a was 0.73 mm; and the width b was 1.47 mm.

The following light guide plate was used: the distance from the light incidence surfaces to their corresponding positions of the first local maximum value was 10 mm; the distance from the position of the second local maximum value (central portion) to the thinnest portions was 274 mm; and the distance from the position of the second local maximum value to the inflection points on the interface z located between the position of the second local maximum value and the thinnest portions was 3 mm. The particle concentration Npo of the first layer 142 was set to 0.003 wt % and the particle concentration Npr of the second layer 144 to 0.225 wt %.

In other words, the combined particle concentration had a first local maximum value of 0.041 wt %, a second local maximum value of 0.078 wt % and a concentration in the thinnest portions of 0.039 wt %.

Example 4-3b used the same light guide plate as that in Example 4-3a except that the particle concentration Npr of the second layer 144 in Example 4-3a was changed to 0.175 wt %. In other words, the combined particle concentration had a first local maximum value of 0.032 wt %, a second local maximum value of 0.061 wt % and a concentration in the thinnest portions of 0.031 wt %.

Example 4-3c used the same light guide plate as that in Example 4-3a except that the particle concentration Npr of the second layer 144 in Example 4-3a was changed to 0.125 wt %. In other words, the combined particle concentration had a first local maximum value of 0.024 wt %, a second local maximum value of 0.044 wt % and a concentration in the thinnest portions of 0.023 wt %.

Example 4-3d used the same light guide plate as that in Example 4-3a except that the distance from the position of the second local maximum value (central portion) to the thinnest portions was changed to 280 mm and the distance from the position of the second local maximum value to the inflection points on the interface z located between the position of the second local maximum value and the thinnest portions was changed to 146 mm.

Example 4-3e used the same light guide plate as that in Example 4-3d except that the particle concentration Npr of the second layer 144 in Example 4-3d was changed to 0.175 wt %.

Example 4-3f used the same light guide plate as that in Example 4-3d except that the particle concentration Npr of the second layer 144 in Example 4-3d was changed to 0.125 wt %.

Example 4-3g used the same light guide plate as that in Example 4-3a except that the distance from the position of the second local maximum value (central portion) to the thinnest portions was changed to 287 mm and the distance from the position of the second local maximum value to the inflection points on the interface z located between the position of the second local maximum value and the thinnest portions was changed to 287 mm.

Example 4-3h used the same light guide plate as that in Example 4-3g except that the particle concentration Npr of the second layer 144 in Example 4-3g was changed to 0.175 wt %.

Example 4-3i used the same light guide plate as that in Example 4-3g except that the particle concentration Npr of the second layer 144 in Example 4-3g was changed to 0.125 wt %.

The light guide plates having the shapes as described above were used to measure the illuminance distributions.

The measured illuminance distributions are shown in FIGS. 17A, 17B, 17C, 18A, 18B, 18C, 19A, 19B and 19C. In FIGS. 17A to 19C, the vertical axis indicates the relative illuminance, and the horizontal axis indicates the distance [mm] from the center of the light guide plate.

Figure 17A:
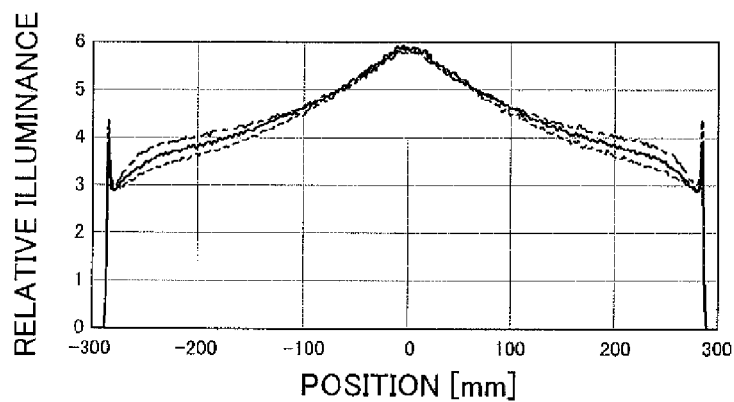
FIGS. 17A, 17B and 17C are graphs showing the measurement results of the illuminance distribution of light emitted through the light exit surface of the light guide plate.
Figure 17B:
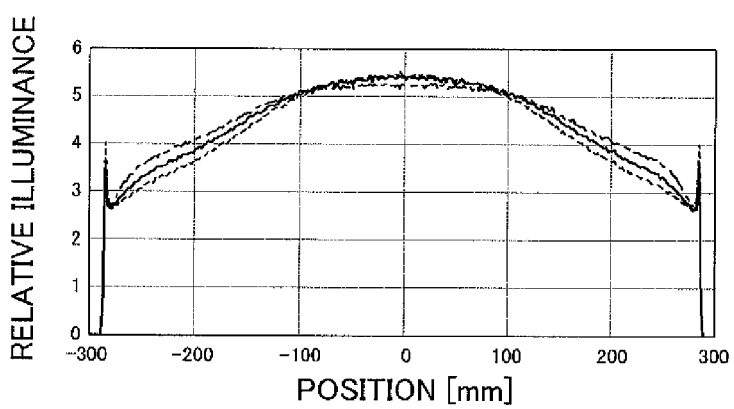
Figure 17C:
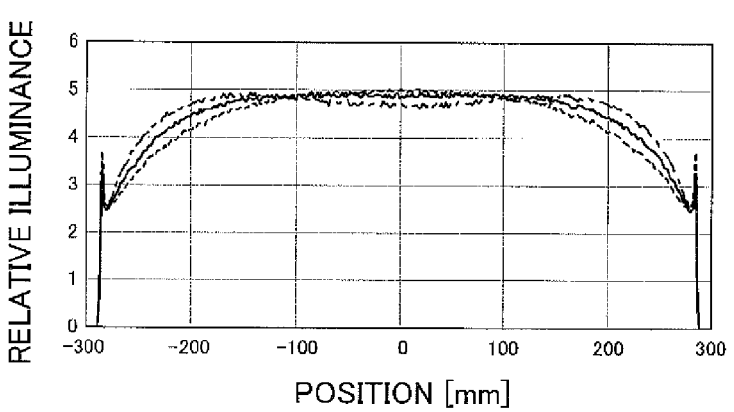

In FIG. 17A, Example 4-1a is indicated by a solid line, Example 4-1b by a broken line, and Example 4-1c by a chain line. In FIG. 17B, Example 4-1d is indicated by a solid line, Example 4-1e by a broken line, and Example 4-1f by a chain line. In FIG. 17C, Example 4-1g is indicated by a solid line, Example 4-1h by a broken line, and Example 4-1i by a chain line.

Figure 18A:
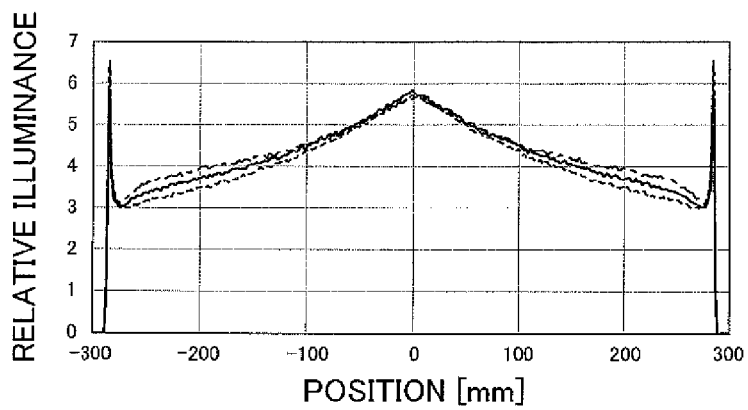
FIGS. 18A, 18B and 18C are graphs showing the measurement results of the illuminance distribution of light emitted through the light exit surface of the light guide plate.
Figure 18B:
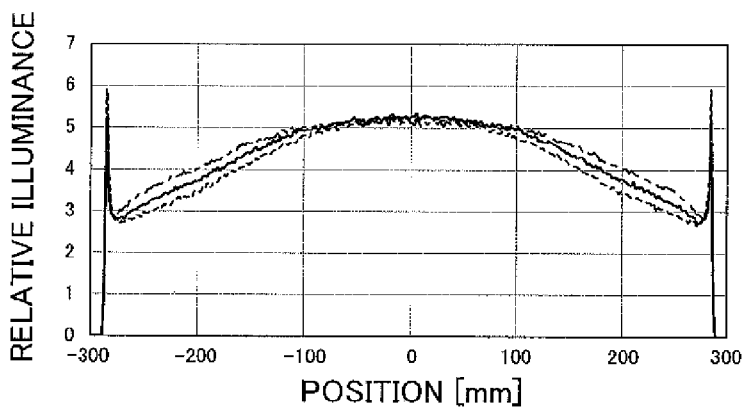
Figure 18C:
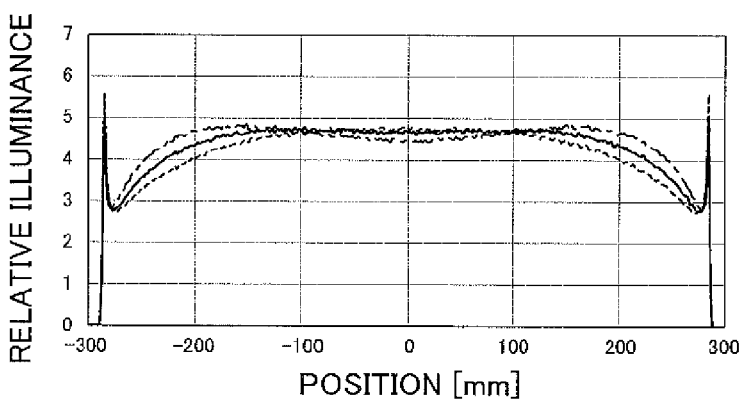

In FIG. 18A, Example 4-2a is indicated by a solid line, Example 4-2b by a broken line, and Example 4-2c by a chain line. In FIG. 18B, Example 4-2d is indicated by a solid line, Example 4-2e by a broken line, and Example 4-2f by a chain line. In FIG. 18C, Example 4-2g is indicated by a solid line, Example 4-2h by a broken line, and Example 4-2i by a chain line.

Figure 19A:
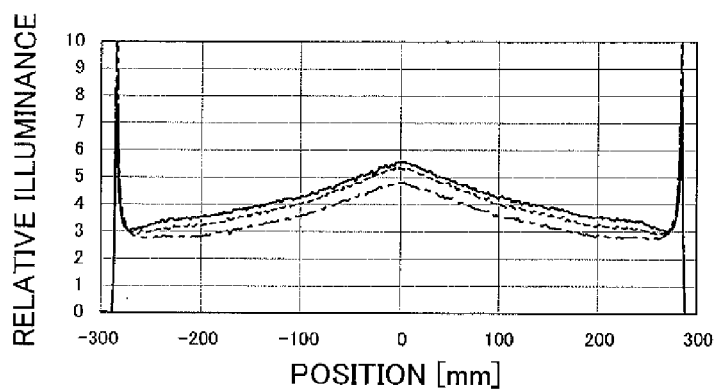
FIGS. 19A, 19B and 19C are graphs showing the measurement results of the illuminance distribution of light emitted through the light exit surface of the light guide plate.
Figure 19B:
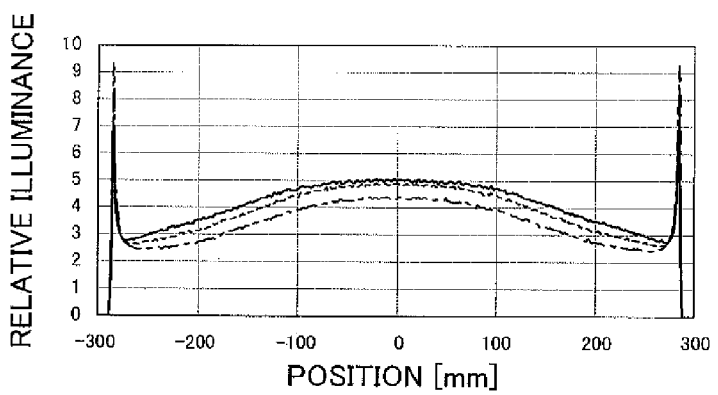
Figure 19C:
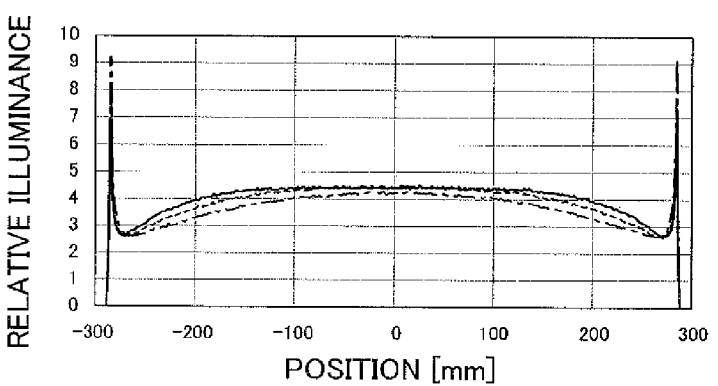

In FIG. 19A, Example 4-3a is indicated by a solid line, Example 4-3b by a broken line, and Example 4-3c by a chain line. In FIG. 19B, Example 4-3d is indicated by a solid line, Example 4-3e by a broken line, and Example 4-3f by a chain line. In FIG. 19C, Example 4-3g is indicated by a solid line, Example 4-3h by a broken line, and Example 4-3i by a chain line.

As shown in FIGS. 17A, 17B, 17C, 18A, 18B, 18C, 19A, 19B and 19C, the 46-inch light guide plates can provide uniform outgoing light illuminance distributions which are higher in the middle by changing the thicknesses of the first and second layers in the direction perpendicular to the light incidence surfaces so that the combined particle concentration may have the first local maximum value on the sides closer to the light incidence surfaces and the second local maximum value which is at the position farther from the light incidence surfaces than the positions of the first local maximum value and is larger than the first local maximum value, and adjusting the shape of the interface between the first layer and the second layer so that the distance from the central portion to the inflection points may be from 3 to 287 mm and the distance from the central portion to the thinnest portions may be from 274 to 287 mm.

Example 5

Next, in Example 5, light guide plates corresponding to a 65-inch screen size were used to determine the illuminance distributions of outgoing light from the backlight units in which the shape of the interface z between the first layer and the second layer was variously changed.

More specifically, use were made of the light guide plates 140 corresponding to the 65-inch screen size which included the interface z as shown in FIG. 6E and in which the length from the first light incidence surface 30c to the second light incidence surface 30d was 829 mm.

In Example 5-1a, the following light guide plate was used: the thickness of the light guide plate 140 was 3.0 mm; the thickness of the second layer 144 at the bisector α, that is, the thickness of the second layer 144 at the position of the second local maximum value was 1.0 mm; the thickness of the second layer 144 at the positions of the first local maximum value was 0.5 mm; and the thickness of the second layer 144 at the thinnest positions between the positions of the first local maximum value and the position of the second local maximum value (thinnest portions) was 0.49 mm. The scattering particles to be kneaded and dispersed in the light guide plate had a particle size of 4.5 μm.

The light-emitting face 58 of each LED chip 50 had the following dimensions: the height a was 2.2 mm; and the width b was 3.0 mm.

The distance from the light incidence surfaces to their corresponding positions of the first local maximum value was set to 10 mm; the distance from the position of the second local maximum value (central portion) to the thinnest portions to 382 mm; and the distance from the position of the second local maximum value to the inflection points on the interface z located between the position of the second local maximum value and the thinnest portions to 13 mm. The particle concentration Npo of the first layer 142 was set to 0.003 wt % and the particle concentration Npr of the second layer 144 to 0.125 wt %.

In other words, the combined particle concentration had a first local maximum value of 0.0233 wt %, a second local maximum value of 0.044 wt % and a concentration in the thinnest portions of 0.0229 wt %.

Example 5-1b used the same light guide plate as that in Example 5-1a except that the particle concentration Npr of the second layer 144 in Example 5-1a was changed to 0.075 wt %. In other words, the combined particle concentration had a first local maximum value of 0.0150 wt %, a second local maximum value of 0.027 wt % and a concentration in the thinnest portions of 0.0148 wt %.

Example 5-1c used the same light guide plate as that in Example 5-1a except that the particle concentration Npr of the second layer 144 in Example 5-1a was changed to 0.175 wt %. In other words, the combined particle concentration had a first local maximum value of 0.032 wt %, a second local maximum value of 0.060 wt % and a concentration in the thinnest portions of 0.031 wt %.

Example 5-1d used the same light guide plate as that in Example 5-1a except that the distance from the position of the second local maximum value (central portion) to the thinnest portions was changed to 395 mm and the distance from the position of the second local maximum value to the inflection points on the interface z located between the position of the second local maximum value and the thinnest portions was changed to 210 mm.

Example 5-1e used the same light guide plate as that in Example 5-1d except that the particle concentration Npr of the second layer 144 in Example 5-1d was changed to 0.075 wt %.

Example 5-1f used the same light guide plate as that in Example 5-1d except that the particle concentration Npr of the second layer 144 in Example 5-1d was changed to 0.175 wt %.

Example 5-1g used the same light guide plate as that in Example 5-1a except that the distance from the position of the second local maximum value (central portion) to the thinnest portions was changed to 405 mm and the distance from the position of the second local maximum value to the inflection points on the interface z located between the position of the second local maximum value and the thinnest portions was changed to 396 mm.

Example 5-1h used the same light guide plate as that in Example 5-1g except that the particle concentration Npr of the second layer 144 in Example 5-1g was changed to 0.075 wt %.

Example 5-1i used the same light guide plate as that in Example 5-1g except that the particle concentration Npr of the second layer 144 in Example 5-1g was changed to 0.175 wt %.

In Example 5-2a, the following light guide plate was used: the thickness of the light guide plate 140 was 1.5 mm; the thickness of the second layer 144 at the bisector α, that is, the thickness of the second layer 144 at the position of the second local maximum value was 0.5 mm; the thickness of the second layer 144 at the positions of the first local maximum value was 0.25 mm; and the thickness of the second layer 144 at the thinnest positions between the positions of the first local maximum value and the position of the second local maximum value (thinnest portions) was 0.24 mm. The scattering particles to be kneaded and dispersed in the light guide plate had a particle size of 4.5 μm.

The light-emitting face 58 of each LED chip 50 had the following dimensions: the height a was 1.1 mm; and the width b was 2.2 mm.

The following light guide plate was used: the distance from the light incidence surfaces to their corresponding positions of the first local maximum value was 10 mm; the distance from the position of the second local maximum value (central portion) to the thinnest portions was 391 mm; and the distance from the position of the second local maximum value to the inflection points on the interface z located between the position of the second local maximum value and the thinnest portions was 6 mm. The particle concentration Npo of the first layer 142 was set to 0.003 wt % and the particle concentration Npr of the second layer 144 to 0.125 wt %.

In other words, the combined particle concentration had a first local maximum value of 0.0233 wt %, a second local maximum value of 0.044 wt % and a concentration in the thinnest portions of 0.0225 wt %.

Example 5-2b used the same light guide plate as that in Example 5-2a except that the particle concentration Npr of the second layer 144 in Example 5-2a was changed to 0.05 wt %. In other words, the combined particle concentration had a first local maximum value of 0.0108 wt %, a second local maximum value of 0.019 wt % and a concentration in the thinnest portions of 0.0105 wt %.

Example 5-2c used the same light guide plate as that in Example 5-2a except that the particle concentration Npr of the second layer 144 in Example 5-2a was changed to 0.175 wt %. In other words, the combined particle concentration had a first local maximum value of 0.032 wt %, a second local maximum value of 0.061 wt % and a concentration in the thinnest portions of 0.031 wt %.

Example 5-2d used the same light guide plate as that in Example 5-2a except that the distance from the position of the second local maximum value (central portion) to the thinnest portions was changed to 398 mm and the distance from the position of the second local maximum value to the inflection points on the interface z located between the position of the second local maximum value and the thinnest portions was changed to 205 mm.

Example 5-2e used the same light guide plate as that in Example 5-2d except that the particle concentration Npr of the second layer 144 in Example 5-2d was changed to 0.05 wt %.

Example 5-2f used the same light guide plate as that in Example 5-2d except that the particle concentration Npr of the second layer 144 in Example 5-2d was changed to 0.175 wt %.

Example 5-2g used the same light guide plate as that in Example 5-2a except that the distance from the position of the second local maximum value (central portion) to the thinnest portions was changed to 405 mm and the distance from the position of the second local maximum value to the inflection points on the interface z located between the position of the second local maximum value and the thinnest portions was changed to 401 mm.

Example 5-2h used the same light guide plate as that in Example 5-2g except that the particle concentration Npr of the second layer 144 in Example 5-2g was changed to 0.05 wt %.

Example 5-2i used the same light guide plate as that in Example 5-2g except that the particle concentration Npr of the second layer 144 in Example 5-2g was changed to 0.175 wt %.

In Example 5-3a, the following light guide plate was used: the thickness of the light guide plate 140 was 1.0 mm; the thickness of the second layer 144 at the bisector α, that is, the thickness of the second layer 144 at the position of the second local maximum value was 0.34 mm; the thickness of the second layer 144 at the positions of the first local maximum value was 0.17 mm; and the thickness of the second layer 144 at the thinnest positions between the positions of the first local maximum value and the position of the second local maximum value (thinnest portions) was 0.168 mm. The scattering particles to be kneaded and dispersed in the light guide plate had a particle size of 4.5 μm.

The light-emitting face 58 of each LED chip 50 had the following dimensions: the height a was 0.73 mm; and the width b was 1.47 mm.

The following light guide plate was used: the distance from the light incidence surfaces to their corresponding positions of the first local maximum value was 10 mm; the distance from the position of the second local maximum value (central portion) to the thinnest portions was 395 mm; and the distance from the position of the second local maximum value to the inflection points on the interface z located between the position of the second local maximum value and the thinnest portions was 210 mm. The particle concentration Npo of the first layer 142 was set to 0.003 wt % and the particle concentration Npr of the second layer 144 to 0.125 wt %.

In other words, the combined particle concentration had a first local maximum value of 0.024 wt %, a second local maximum value of 0.044 wt % and a concentration in the thinnest portions of 0.023 wt %.

Example 5-3b used the same light guide plate as that in Example 5-3a except that the particle concentration Npr of the second layer 144 in Example 5-3a was changed to 0.05 wt %. In other words, the combined particle concentration had a first local maximum value of 0.0110 wt %, a second local maximum value of 0.019 wt % and a concentration in the thinnest portions of 0.0109 wt %.

Example 5-3c used the same light guide plate as that in Example 5-3a except that the particle concentration Npr of the second layer 144 in Example 5-3a was changed to 0.175 wt %. In other words, the combined particle concentration had a first local maximum value of 0.0322 wt %, a second local maximum value of 0.061 wt % and a concentration in the thinnest portions of 0.0319 wt %.

The light guide plates having the shapes as described above were used to measure the illuminance distributions.

The measured illuminance distributions are shown in FIGS. 20A, 20B, 20C, 21A, 21B, 21C, and 22. In FIGS. 20A to 22, the vertical axis indicates the relative illuminance, and the horizontal axis indicates the distance [mm] from the center of the light guide plate.

In FIG. 20A, Example 5-1a is indicated by a solid line, Example 5-1b by a broken line, and Example 5-1c by a chain line. In FIG. 20B, Example 5-1d is indicated by a solid line, Example 5-1e by a broken line, and Example 5-1f by a chain line. In FIG. 20C, Example 5-1g is indicated by a solid line, Example 5-1h by a broken line, and Example 5-1i by a chain line.

Figure 21A:
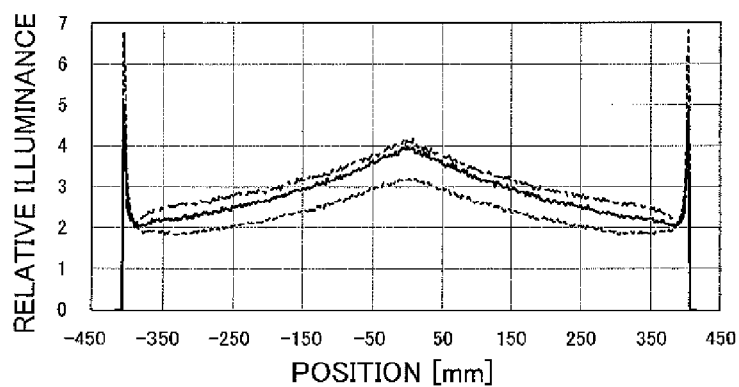
FIGS. 21A, 21B and 21C are graphs showing the measurement results of the illuminance distribution of light emitted through the light exit surface of the light guide plate.
Figure 21B:
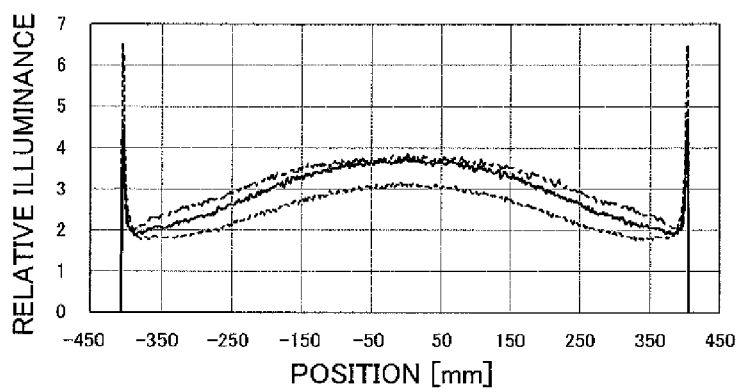
Figure 21C:
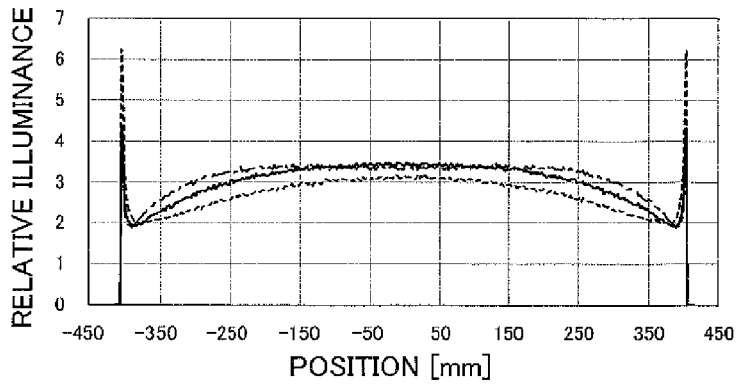

In FIG. 21A, Example 5-2a is indicated by a solid line, Example 5-2b by a broken line, and Example 5-2c by a chain line. In FIG. 21B, Example 5-2d is indicated by a solid line, Example 5-2e by a broken line, and Example 5-2f by a chain line. In FIG. 21C, Example 5-2g is indicated by a solid line, Example 5-2h by a broken line, and Example 5-2i by a chain line.

Figure 22:
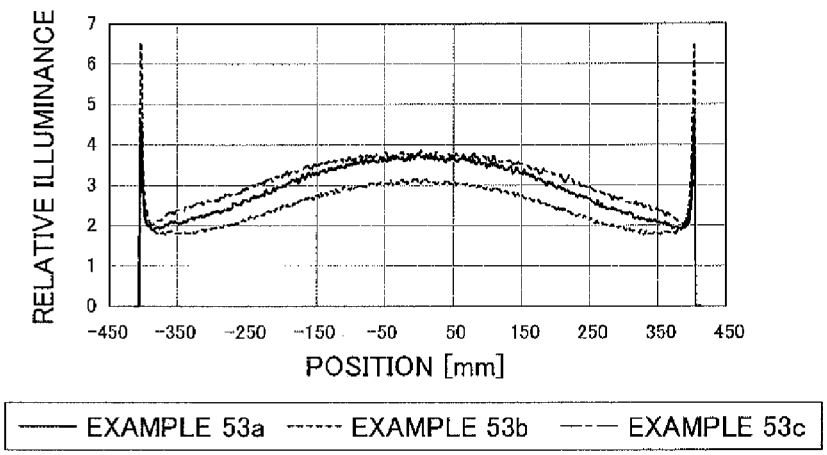
FIG. 22 is a graph showing the measurement results of the illuminance distribution of light emitted through the light exit surface of the light guide plate.

In FIG. 22, Example 5-3a is indicated by a solid line, Example 5-3b by a broken line, and Example 5-3c by a chain line.

As shown in FIGS. 20A, 20B, 20C, 21A, 21B, 21C, and 22, the 65-inch light guide plates can provide uniform outgoing light illuminance distributions which are higher in the middle by changing the thicknesses of the first and second layers in the direction perpendicular to the light incidence surfaces so that the combined particle concentration may have the first local maximum value on the sides closer to the light incidence surfaces and the second local maximum value which is at the position farther from the light incidence surfaces than the positions of the first local maximum value and is larger than the first local maximum value, and adjusting the shape of the interface between the first layer and the second layer so that the distance from the central portion to the inflection points may be from 4 to 402 mm and the distance from the central portion to the thinnest portions may be from 382 to 405 mm.

Example 6

Next, in Example 6, light guide plates corresponding to a 20-inch screen size were used to determine the illuminance distributions of outgoing light from the backlight units in which the shape of the interface z between the first layer and the second layer was variously changed.

More specifically, use were made of the light guide plates 140 which included the interface z as shown in FIG. 6E and in which the length from the first light incidence surface 30$c$ to the second light incidence surface 30$d$ was 269 mm.

In Example 6-1a, the following light guide plate was used: the thickness of the light guide plate 140 was 3.0 mm; the thickness of the second layer 144 at the bisector α, that is, the thickness of the second layer 144 at the position of the second local maximum value was 1.0 mm; the thickness of the second layer 144 at the positions of the first local maximum value was 0.5 mm; and the thickness of the second layer 144 at the thinnest positions between the positions of the first local maximum value and the position of the second local maximum value (thinnest portions) was 0.49 mm. The scattering particles to be kneaded and dispersed in the light guide plate had a particle size of 4.5 μm.

The light-emitting face 58 of each LED chip 50 had the following dimensions: the height a was 2.2 mm; and the width b was 3.0 mm.

The distance from the light incidence surfaces to their corresponding positions of the first local maximum value was set to 10 mm; the distance from the position of the second local maximum value (central portion) to the thinnest portions to 453 mm; and the distance from the position of the second local maximum value to the inflection points on the interface z located between the position of the second local maximum value and the thinnest portions to 435 mm. The particle concentration Npo of the first layer 142 was set to 0.09 wt % and the particle concentration Npr of the second layer 144 to 0.2 wt %.

In other words, the combined particle concentration had a first local maximum value of 0.1083 wt %, a second local maximum value of 0.127 wt % and a concentration in the thinnest portions of 0.1080 wt %.

Example 6-1b used the same light guide plate as that in Example 6-1a except that the particle concentration Npo of the first layer 142 and the particle concentration Npr of the second layer 144 in Example 6-1a were changed to 0.01 wt % and 0.4 wt %, respectively. In other words, the combined particle concentration had a first local maximum value of 0.075 wt %, a second local maximum value of 0.140 wt % and a concentration in the thinnest portions of 0.074 wt %.

Example 6-1c used the same light guide plate as that in Example 6-1a except that the particle concentration Npo of the first layer 142 and the particle concentration Npr of the second layer 144 in Example 6-1a were changed to 0.003 wt % and 0.4 wt %, respectively. In other words, the combined particle concentration had a first local maximum value of 0.069 wt %, a second local maximum value of 0.135 wt % and a concentration in the thinnest portions of 0.068 wt %.

Example 6-1d used the same light guide plate as that in Example 6-1a except that the particle concentration Npo of the first layer 142 and the particle concentration Npr of the second layer 144 in Example 6-1a were changed to 0.003 wt % and 0.8 wt %, respectively. In other words, the combined particle concentration had a first local maximum value of 0.136 wt %, a second local maximum value of 0.269 wt % and a concentration in the thinnest portions of 0.133 wt %.

The light guide plates having the shapes as described above were used to measure the illuminance distributions.

Figure 23:
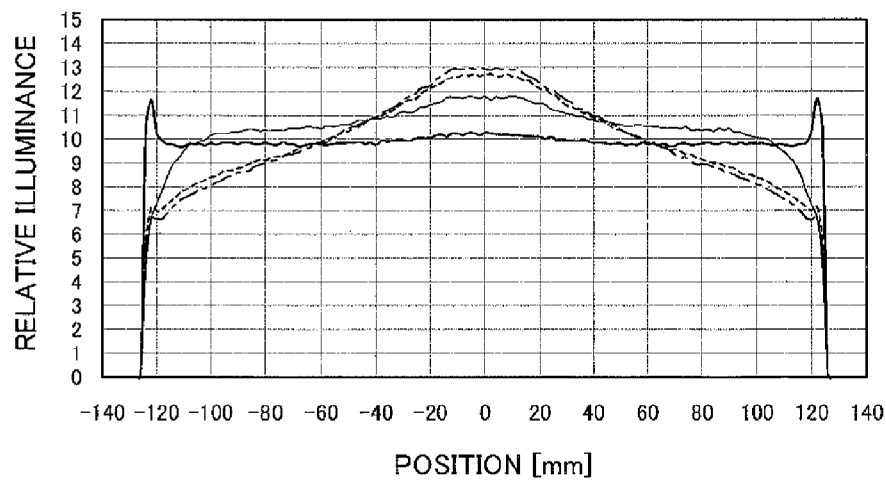
FIG. 23 is a graph showing the measurement results of the illuminance distribution of light emitted through the light exit surface of the light guide plate.

The measured illuminance distributions are shown in FIG. 23. In FIG. 23, the vertical axis indicates the relative illuminance, and the horizontal axis indicates the distance [mm] from the center of the light guide plate.

In FIG. 23, Example 6-1a is indicated by a solid line, Example 6-1b by a broken line, Example 6-1c by a chain line, and Example 6-1d by a thin solid line.

As shown in FIG. 23, even light guide plates each having a size as small as 20 inches can provide outgoing light illuminance distributions which are brighter in the middle by forming the light guide plate having two or more layers which are different in the particle concentration, and by adjusting the thickness of the second layer having a higher particle concentration so as to have a shape which continuously changes such that the second layer once increases in thickness with increasing distance from the light incidence surfaces, then decreases in thickness and subsequently increases in thickness again.

Next, the light guide plates in Examples 3 to 6 were compared with the light guide plate having the shape shown in FIG. 25.

First, Example 3-1d was compared with Comparative Example 3-1d.

Comparative Example 3-1d used the same light guide plate as that in Example 3-1d except that the light guide plate used had no mixing zone M. More specifically, the length between the light incidence surfaces was set to 413 mm; the thickness of the light guide plate was set to 3 mm; the thickness of the second layer in the central portion was set to 2.0 mm; the thickness of the second layer at the light incidence surfaces was set to 1.0 mm; the distance from the middle high portion to the thinnest portions was set to 189 mm; the distance from the central portion to the inflection points was set to 101 mm; the particle concentration Npo of the first layer 142 was set to 0.003 wt %; and the particle concentration Npr of the second layer 144 was set to 0.275 wt %.

Next, Example 4-1d was compared with Comparative Example 4-1d.

Comparative Example 4-1d used the same light guide plate as that in Example 4-1d except that the light guide plate used had no mixing zone M.

Next, Example 5-1g was compared with Comparative Example 5-1g.

Comparative Example 5-1g used the same light guide plate as that in Example 5-1g except that the light guide plate used had no mixing zone M.

The light guide plates having the shapes as described above were used to measure the illuminance distributions.

Then, Example 6-1b was compared with Comparative Example 6-1b.

Comparative Example 6-1b used the same light guide plate as that in Example 6-1b except that the light guide plate used had no mixing zone M.

The light guide plates having the shapes as described above were used to measure the illuminance distributions.

The measured illuminance distributions are shown in FIGS. 24A to 24D. In FIGS. 24A to 24D, the vertical axis indicates the relative illuminance, and the horizontal axis indicates the distance [mm] from the center of the light guide plate.

Figure 24A:
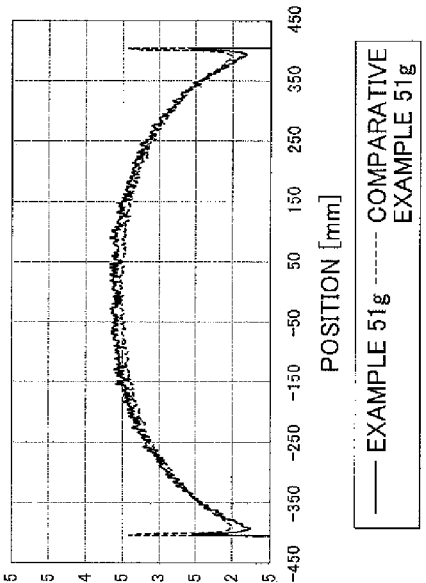
FIGS. 24A to 24D are graphs showing the measurement results of the illuminance distribution of light emitted through the light exit surface of the light guide plate.
Figure 24C:
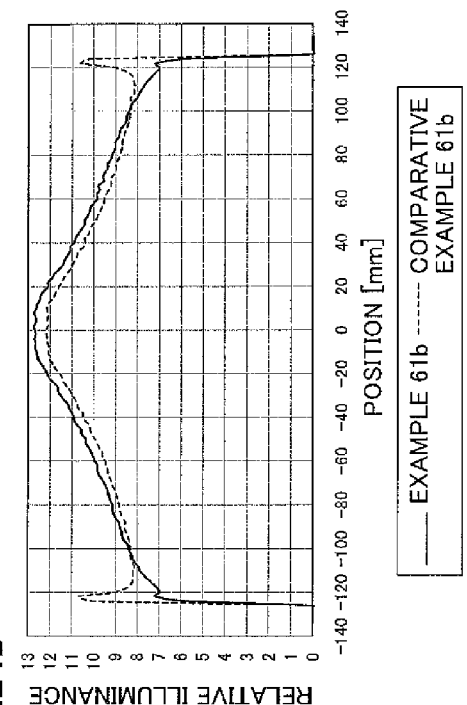
Figure 24B:
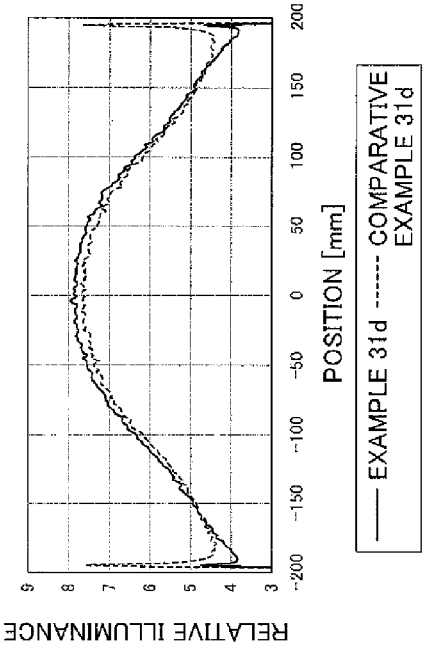
Figure 24D:
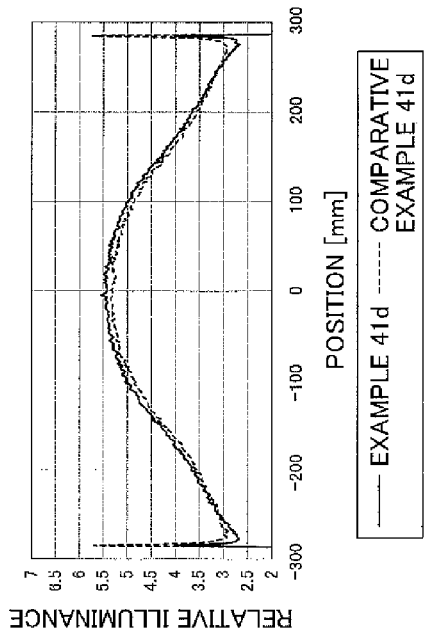

In FIG. 24A, Example 3-1d is indicated by a solid line and Comparative Example 3-1d by a broken line. In FIG. 24B, Example 4-1d is indicated by a solid line and Comparative Example 4-1d by a broken line. In FIG. 24C, Example 5-1g is indicated by a solid line and Comparative Example 5-1g by a broken line. In FIG. 24D, Example 6-1b is indicated by a solid line and Comparative Example 6-1b by a broken line.

As shown in FIGS. 24A to 24D, compared to the light guide plate having the shape shown in FIG. 25, the light guide plates in Examples 3-1d, 4-1d, 5-1g and 6-1b according to the invention decrease in illuminance and luminance in close proximity to the light incidence surfaces, that is, at the positions corresponding to the mixing zones M and increase in illuminance and luminance in the central region of the light guide plate, that is, at the position corresponding to the effective screen area E.

The illuminance and luminance in the effective screen area E can be thus increased to improve the light use efficiency.

While the light guide plate and the planar lighting device according to the invention have been described above in detail, the invention is not limited in any manner to the above embodiments and various improvements and modifications may be made without departing from the spirit of the invention.

What is claimed is:

1. A light guide plate comprising: a rectangular light exit surface; at least one light incidence surface which is provided on at least one end side of said light exit surface and through which light enters; a rear surface on an opposite side from said light exit surface; and scattering particles dispersed in said light guide plate, wherein said light guide plate includes two or more layers superposed on each other in a direction substantially perpendicular to said light exit surface and containing said scattering particles at different particle concentrations, wherein said two or more layers include a first layer disposed on a side closer to said light exit surface and a second layer disposed on a side closer to said rear surface than said first layer and Npo and Npr satisfy a relationship expressed by Npr>Npo where Npo represents a particle concentration of said first layer and Npr represents a particle concentration of said second layer, wherein thicknesses of said first and second layers in the direction substantially perpendicular to said light exit surface change so that a combined particle concentration of said light guide plate has, in a direction perpendicular to said at least one light incidence surface, a first local maximum value on at least one side closer to said at least one light incidence surface and a second local maximum value located at a position farther from said at least one light incidence surface than at least one position of said first local maximum value and being larger than said first local maximum value, whereupon the thickness of said second layer continuously changes so that the second layer increases in thickness with increasing distance from said at least one light incidence surface, then decreases in thickness and subsequently increases in thickness again, and wherein an interface between said first layer and said second layer in a region corresponding to an area from the at least one position of said first local maximum value to a position of said second local maximum value includes at least one curved surface concave toward said light exit surface on at least one side on which the combined particle concentration takes said first local maximum value, and a curved surface smoothly connected to said at least one concave curved surface and convex toward said light exit surface on a side on which the combined particle concentration takes said second local maximum value such that said combined particle concentration smoothly changes from the at least one position of said first local maximum value to the position of said second local maximum value.

2. The light guide plate according to claim 1, wherein in said light exit surface, at least the region corresponding to the area from the at least one position of said first local maximum value to the position of said second local maximum value is an effective screen area.

3. The light guide plate according to claim 1, wherein said at least one light incidence surface comprises two light incidence surfaces provided on two opposite end sides of said light exit surface and said combined particle concentration has said first local maximum value on both sides closer to the two light incidence surfaces.

4. The light guide plate according to claim 3, wherein said second layer has a maximum thickness at a central portion of said light exit surface.

5. The light guide plate according to claim 1, wherein said at least one light incidence surface is provided on one end side of said light exit surface and said combined particle concentration has said first local maximum value at one position.

6. The light guide plate according to claim 1, wherein Npo and Npr fall within ranges satisfying Npo=0 wt % and 0.01 wt %<Npr<0.8 wt %.

7. The light guide plate according to claim 1, wherein Npo and Npr fall within ranges satisfying 0 wt %<Npo<0.15 wt % and Npo<Npr<0.8 wt %.

8. The light guide plate according to claim 1, wherein said rear surface is a flat surface parallel to said light exit surface.

9. A planar lighting device comprising:
the light guide plate according to claim 1;
at least one light source disposed so as to face said at least one light incidence surface of said light guide plate; and
a housing containing said light guide plate and said at least one light source and having an opening on a side closer to said light exit surface of said light guide plate, said opening being smaller than said light exit surface,
wherein said first local maximum value of said combined particle concentration is located at a position corresponding to a vicinity of an edge of said opening of said housing.

* * * * *